(12) United States Patent
Shin et al.

(10) Patent No.: US 11,640,670 B2
(45) Date of Patent: May 2, 2023

(54) DEVICE AND METHOD FOR COMPENSATING CROSSTALK OF IMAGE SENSOR HAVING MULTI-COLOR FILTER ARRAY

(71) Applicant: Samsung Electronics Co., Ltd., Suwon-si (KR)

(72) Inventors: Deokha Shin, Anyang-si (KR); Eunji Jeong, Suwon-si (KR); Youngjun Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 292 days.

(21) Appl. No.: 17/146,524

(22) Filed: Jan. 12, 2021

(65) Prior Publication Data
US 2021/0383555 A1 Dec. 9, 2021

(30) Foreign Application Priority Data
Jun. 4, 2020 (KR) ......................... 10-2020-0067910

(51) Int. Cl.
*G06T 7/254* (2017.01)
*G06T 9/00* (2006.01)
*G06T 7/90* (2017.01)

(52) U.S. Cl.
CPC ............. *G06T 7/254* (2017.01); *G06T 7/90* (2017.01); *G06T 9/001* (2013.01)

(58) Field of Classification Search
None
See application file for complete search history.

(56) References Cited

U.S. PATENT DOCUMENTS

| | | |
|---|---|---|
| 6,806,856 B2 | 10/2004 | Starkweather |
| 6,831,686 B1 | 12/2004 | Koren et al. |
| 7,349,574 B1 | 3/2008 | Sodini et al. |
| 8,068,406 B2 | 11/2011 | Kim et al. |
| RE43,991 E | 2/2013 | Sun et al. |
| 8,471,921 B1 | 6/2013 | Li |
| 8,619,163 B2 | 12/2013 | Ogura et al. |
| 8,767,100 B2 | 7/2014 | Chen et al. |

(Continued)

FOREIGN PATENT DOCUMENTS

| | | | | |
|---|---|---|---|---|
| CN | 109155827 A | * | 1/2019 | ....... H01L 27/14609 |
| JP | 2006121164 A | | 5/2006 | |
| WO | 2017161107 A1 | | 9/2017 | |

OTHER PUBLICATIONS

English translation of CN-109155827-A, Magnani, Jan. 2019 (Year: 2019).*

*Primary Examiner* — James M Hannett
(74) *Attorney, Agent, or Firm* — Muir Patent Law, PLLC

(57) ABSTRACT

Disclosed is an electronic device which includes a processing block, a crosstalk compensation block, and a dark level compensation block. The processing block receives image data from an active pixel region of an image sensor and performs pre-processing on the image data. The crosstalk compensation block performs crosstalk compensation on the pre-processed image data. The dark level compensation block performs the crosstalk compensation on dark level data received from an optical black region of the image sensor and performs a subtraction operation on the crosstalk-compensated image data and the crosstalk-compensated dark level data.

20 Claims, 18 Drawing Sheets

(56) References Cited

U.S. PATENT DOCUMENTS

| | | |
|---|---|---|
| 9,232,159 B2 | 1/2016 | Velichko et al. |
| 10,225,495 B2 | 3/2019 | Lee et al. |
| 2003/0202111 A1 | 10/2003 | Park |
| 2013/0320309 A1* | 12/2013 | Kim .................... H01L 51/441 |
| | | 257/40 |
| 2014/0078349 A1 | 3/2014 | Velichko et al. |
| 2019/0252453 A1 | 8/2019 | Hanelt et al. |

* cited by examiner

: Shaded Region

: Shaded Region

: Shaded Region

: Shaded Region

DEVICE AND METHOD FOR COMPENSATING CROSSTALK OF IMAGE SENSOR HAVING MULTI-COLOR FILTER ARRAY

CROSS-REFERENCE TO RELATED APPLICATIONS

This application claims priority under 35 U.S.C. § 119 to Korean Patent Application No. 10-2020-0067910 filed on Jun. 4, 2020, in the Korean Intellectual Property Office, the disclosure of which is incorporated by reference herein in its entirety.

BACKGROUND

The present disclosure relates to an electronic device, and more particularly, relates to an electronic device for compensating crosstalk of a multi-color filter array in an image sensor.

An image sensor may be a charge coupled device (CCD) image sensor, a complementary metal-oxide semiconductor (CMOS) image sensor (CIS), etc. The CMOS image sensor includes pixels formed of CMOS transistors and converts light energy into an electrical signal by using a photoelectric conversion element included in each pixel. The CMOS image sensor obtains information about a captured/photographed image by using the electrical signal generated at each pixel.

Nowadays, an image sensor having a multi-color filter array is adopted in various fields, and pixels that are formed to share a floating diffusion region (or so-called floating diffusion node) are also adopted in various fields. However, the order of manufacturing respective color filters constituting the multi-color filter array varies depending on a type of a color filter, thereby causing a height (or thickness) difference of color filters. This height difference may not be problematic in an image sensor having a general Bayer pattern. However, in the case of a Bayer pattern in which a plurality of pixels share one floating diffusion region (e.g., a tetra-Bayer pattern), a height (or thickness) difference of color filters may cause an optical crosstalk.

SUMMARY

The technical idea of the present disclosure provides an electronic device and a method for compensating crosstalk due to a height difference of filters in a multi-color filter array.

According to an exemplary embodiment, an electronic device includes a processing block that receives image data from an active pixel region of an image sensor and performs pre-processing on the image data, a crosstalk compensation block that performs crosstalk compensation on the pre-processed image data, and a dark level compensation block that performs the crosstalk compensation on dark level data received from an optical black region of the image sensor and performs a subtraction operation on the crosstalk-compensated image data and the crosstalk-compensated dark level data.

According to an exemplary embodiment, an electronic device includes an image sensor that includes an active pixel region and an optical black region, the active pixel region including a plurality of unit pixel groups, each of the plurality of unit pixel groups including a plurality of pixels that shares a floating diffusion region, and the image sensor outputting image data corresponding to the active pixel region and outputting dark level data corresponding to the optical black region, an image signal processor (ISP) front end block that performs crosstalk compensation on the image data, performs the crosstalk compensation on the dark level data, and performs a subtraction operation on the crosstalk-compensated image data and the crosstalk-compensated dark level data, and an image signal processor that receives and processes image data on which the subtraction operation is performed.

According to an exemplary embodiment, a method for processing signals output from an image sensor, which includes an active pixel region including first pixels sharing a first floating diffusion region and second pixels sharing a second floating diffusion region and an optical black region, includes generating image data based on a signal output from a pixel selected from the first pixels, generating dark level data based on a signal output from the optical black region, performing crosstalk compensation according to a height difference of a first color filter covering the first pixels and a second color filter covering the second pixels, on the image data, performing the crosstalk compensation on the dark level data, and performing a subtraction operation on the crosstalk-compensated image data and the crosstalk-compensated dark level data

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Below, embodiments of the inventive concept are described in detail and clearly to such an extent that an ordinary one in the art can implement the inventive concept.

Components that are described in the detailed description with reference to the terms "unit", "module", "block", "~er or ~or", etc., and function blocks illustrated in drawings will be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 1:
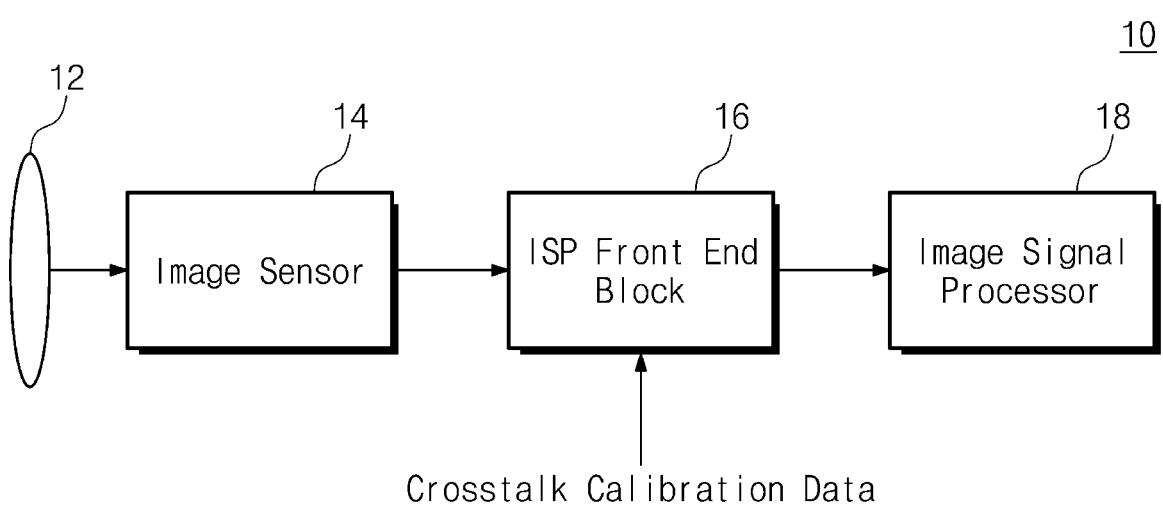
FIG. 1 illustrates an exemplary configuration of an image processing block according to an embodiment of the present disclosure.

FIG. 1 illustrates an exemplary configuration of an image processing block according to an embodiment of the present disclosure. An image processing block 10 may be implemented as a part of various electronic devices, such as a smartphone, a digital camera, a laptop computer, and a desktop computer. The image processing block 10 may include a lens 12, an image sensor 14, an image signal processor (ISP) front end block 16, and an image signal processor 18.

In operation, a light is reflected by an object, a scenery, etc., targeted for photographing, and the lens 12 receives the reflected light. The image sensor 14 generates an electrical signal based on the light received through the lens 12. The ISP front end block 16 processes the electrical signal output from the image sensor 14 to be appropriate for processing by the image signal processor 18. The image signal processor 18 generates image data associated with the photographed object and scenery by appropriately processing the electrical signal processed by the ISP front end block 16.

The image sensor 14 may include an active pixel sensor (APS) region and an optical black region. Pixels of the active pixel sensor region convert a light into an electrical signal, and pixels of the optical black region output a dark current regardless of the light. The dark current output from the optical black region may be used to compensate a dark level. For example, the image sensor 14 may be implemented with a complementary metal-oxide semiconductor (CMOS) image sensor or the like.

One lens 12 and one image sensor 14 are illustrated in FIG. 1. However, in another example, the image processing block 10 may include a plurality of lenses, a plurality of ISP front end blocks, and a plurality of image sensors. The plurality of image sensors may be provided to have different functions, different performances, and/or different characteristics. In some embodiments, the image sensors may include lenses having different fields of view (FOV), respectively.

The ISP front end block 16 may perform pre-processing on a signal output from the image sensor 14. For example, the ISP front end block 16 may perform crosstalk compensation, dark level compensation, etc., on the signal output from the image sensor 14. In particular, in auto dark level compensation (ADLC) for a signal output from the image sensor 14, the ISP front end block 16 of the present disclosure considers crosstalk compensation according to a height difference of color filters of pixels constituting the image sensor 14. For example, the ISP front end block 16 compensates a dark level based on crosstalk calibration data calculated in advance. Accordingly, a fixed pattern noise (FPN) may be removed.

The image signal processor 18 may generate image data associated with an object, a scenery, etc. based on data processed by the ISP front end block 16. To this end, the image signal processor 18 may perform various processing such as color interpolation, color correction, auto white balance, gamma correction, color saturation correction, formatting, bad pixel correction, and hue correction.

Figure 2:
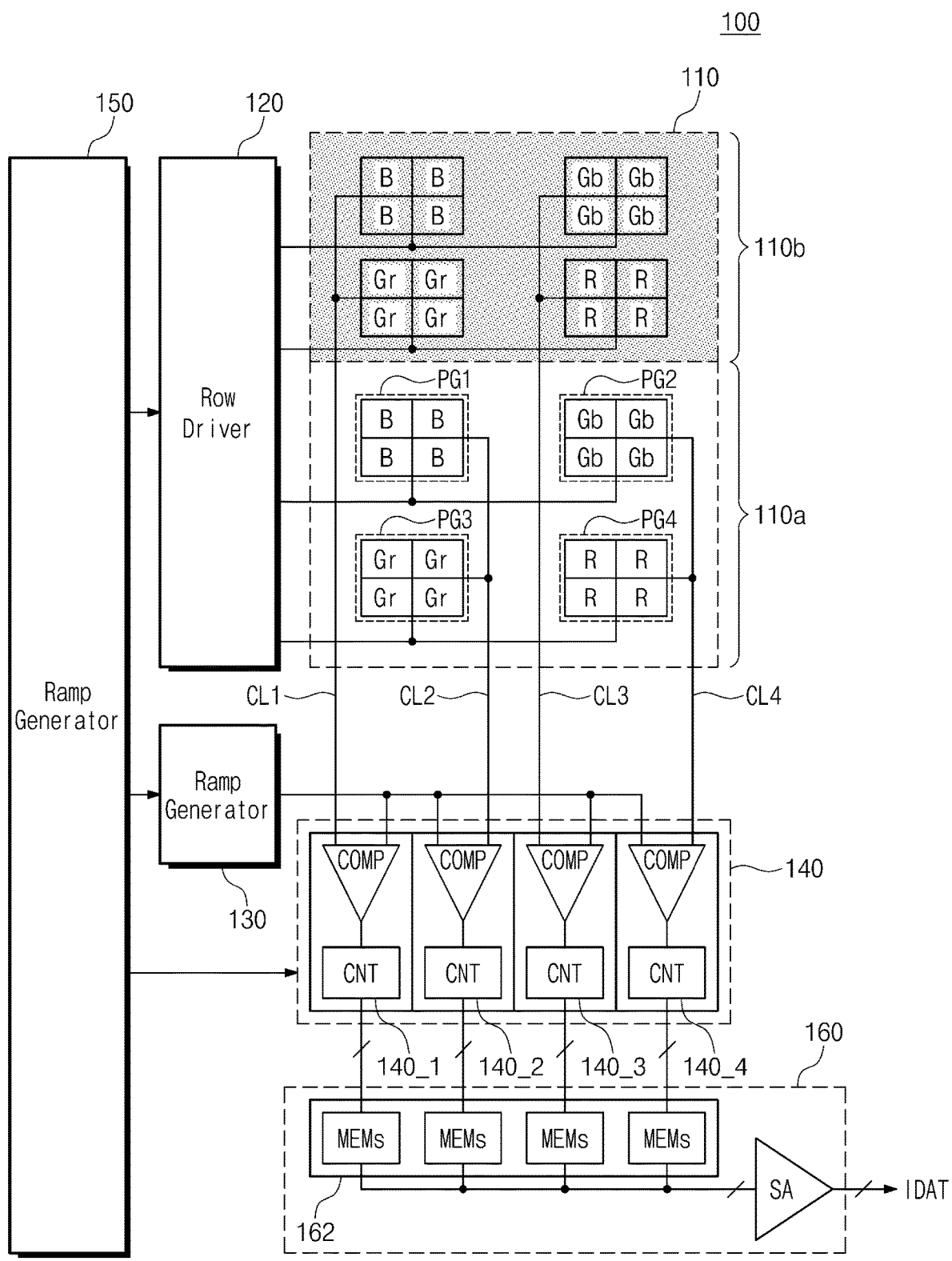
FIG. 2 illustrates an exemplary configuration of an image sensor of FIG. 1, according to one embodiment.

FIG. 2 illustrates an exemplary configuration of the image sensor 14 of FIG. 1. An image sensor 100 may include a pixel array 110, a row driver 120, a ramp signal generator 130, an analog-to-digital converting block (hereinafter referred to as an "ADC block") 140, a timing controller 150, and a buffer 160.

The pixel array 110 may include a plurality of pixels arranged in a matrix form along rows and columns and may be divided into an active pixel region 110a and an optical black region 110b. Each of the plurality of pixels may include a photoelectric conversion element. A pixel of the active pixel region 110a may sense a light by using the photoelectric conversion element and may convert the sensed light into an electrical signal (hereinafter referred to as a "pixel signal"). A pixel of the optical black region 110b may output an electrical signal (i.e., a dark level offset signal) regardless of an incident light. For example, the photoelectric conversion element may include a photo diode, a photo transistor, a photo gate, a pinned photo diode, etc. An embodiment is illustrated in FIG. 1 as the optical black region 110b is disposed at a top row of the pixel array 110, but the present disclosure is not limited thereto.

The pixel array 110 may include a plurality of pixel groups. Each pixel group PG may include at least two or more pixels. An embodiment is illustrated in FIG. 2 as the pixel group PG includes four pixels arranged in two rows and two columns. Pixels constituting one pixel group PG may share one floating diffusion region (or a floating diffusion node). However, the present disclosure is not limited thereto. For example, pixels constituting one pixel group PG may share a plurality of floating diffusion regions. In addition, an example is illustrated in FIG. 2 as the pixel array 110 includes pixel groups arranged in four rows and two columns (i.e., 4×2 pixel groups). However, the present disclosure is not limited thereto.

A pixel group PG may include pixels of the same color. For example, a pixel group PG may include a red pixel "R" to convert a light of a red spectrum into an electrical signal, a green pixel Gr/Gb to convert a light of a green spectrum into an electrical signal, or a blue pixel "B" to convert a light of a blue spectrum into an electrical signal. For example, the pixels constituting the pixel array 110 may be arranged in the form of a tetra-Bayer pattern.

A plurality of color filters may be formed in the pixel groups PG constituting the pixel array 110. For example, a multi-color filter array (multi-CFA) may be formed thereon. A height at which a color filter is formed (e.g., a height of a top surface of the color filter) may vary depending on a process order. For example, a height of a respectively early formed color filter from a substrate may be respectively low. In contrast, a height of a respectively late formed color filter from the substrate may be relatively high. The respectively early formed color filter may be influenced by the respectively late formed color filter, thereby causing the crosstalk between pixels. This will be more fully described with reference to FIG. 3.

Pixel groups arranged along one column may be alternately connected with two column lines. For example, some of pixel groups disposed at a first column may be connected with a first column line CL1, and the others thereof may be connected with a second column line CL2. As in the above description, some of pixel groups disposed at a second column may be connected with a third column line CL3, and the others thereof may be connected with a fourth column line CL4.

The row driver 120 is configured to select and drive a row of the pixel array 110. The row driver 120 may decode an address and/or a control signal generated by the timing controller 150 and may generate control signals for selecting and driving a row of the pixel array 110. For example, the control signals may include a signal for selecting a pixel, a signal for resetting a floating diffusion region, a signal for selecting a column line, etc.

The ramp signal generator 130 is configured to generate a ramp signal. The ramp signal generator 130 may operate under control of the timing controller 150. For example, the ramp signal generator 130 may operate in response to a control signal such as a ramp enable signal or a mode signal. When the ramp enable signal is activated, the ramp signal generator 130 may generate the ramp signal having a slope set based on the mode signal.

The ADC block 140 is configured to convert an analog signal (i.e., a pixel signal or a dark level offset signal) output from the pixel array 110 to a digital signal. For example, the ADC block 140 may convert a pixel signal to a digital signal to generate a value including a signal level and a dark level. The ADC block 140 may convert a dark level offset signal output from the optical black region 110b to a digital signal to generate a value including a dark level.

In an embodiment, the ADC block 140 may include four ADCs 140_1, 140_2, 140_3, and 140_4, each of which includes a comparator COMP and a counter CNT. The comparator COMP may compare a pixel signal output through a column line (i.e., one of CL1 to CL4) connected with the comparator COMP with a ramp signal RAMP (refer to FIG. 8A) and may output a comparison result. For example, the comparator COMP may operate based on a correlated double sampling (CDS) technique for obtaining a reset signal and an image signal with regard to a pixel signal and extracting a difference between the reset signal and the image signal as an effective signal component.

The counter CNT may operate under control of the timing controller 150 and may count pulses of an output signal of the comparator COMP. For example, the counter CNT may operate in response to control signals such as a counter clock signal, a counter reset signal for controlling a reset of the counter CNT, and an inversion signal for inverting an internal bit of the counter CNT. The counter CNT may count a comparison result signal depending on the counter clock signal and may output a result of the counting as a digital signal.

The counter CNT may include an up/down counter, a bit-wise inversion counter, etc. An operation of the bit-wise counter may be similar to an operation of the up/down counter. For example, the bit-wise counter may perform the following functions: a function to perform only up-counting and a function to invert all internal bits of the counter in response to a specific signal to obtain the 1's complement when a specific signal is received. The bit-wise counter may perform a reset count and may invert a result of the reset count to the 1's complement, that is, a negative value.

The timing controller 150 is configured to generate a control signal and/or a clock for controlling an operation and/or a timing of each of the row driver 120, the ramp signal generator 130, the ADC block 140, and the counter CNT.

The buffer 160 may include a set 162 of memories MEMs (e.g., memory cells) and a sense amplifier SA. Each of the memories MEMs may store a digital signal output from the corresponding ADC. The sense amplifier SA may sense and amplify the digital signals stored in the memories MEMs. The sense amplifier SA may output the amplified digital signals as image data IDAT. For example, the image data IDAT may be formed of 11 bits. Although not illustrated in drawing, the sense amplifier SA may amplify a digital signal (i.e., a second code value) output from the ADC and may output the amplified signal as dark level data. The dark level data may be used in dark level compensation.

Figure 3:
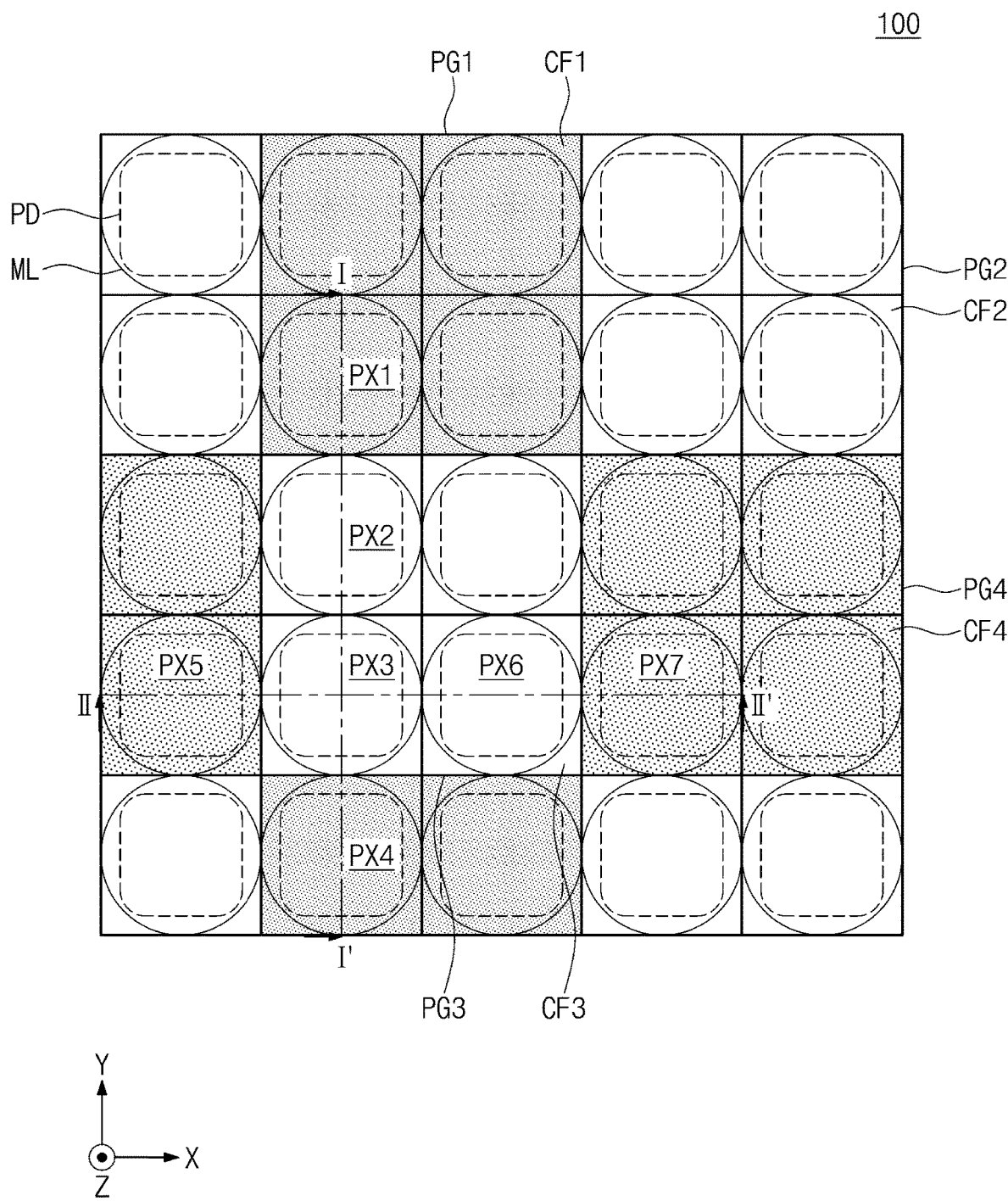
FIG. 3 illustrates a plan view of an image sensor of FIG. 1, according to one embodiment.

FIG. 3 illustrates a plan view of an image sensor of FIG. 1. In an embodiment, FIG. 3 shows a plan view of the pixel array 110 of the image sensor 100 illustrated in FIG. 2. The image sensor 100 may include pixel groups PG1 to PG4. However, in addition to the pixel groups PG1 to PG4, other pixels adjacent thereto are further illustrated in FIG. 3 for the purpose of illustrating cross-section views of the image sensor 100 taken along line I-I' and line II-II'. The pixel groups PG1 to PG4 may be repeatedly formed on a substrate of the image sensor 100 along an X-axis and a Y-axis. Each of the pixel groups PG1 to PG4 may include 2×2 pixels arranged along the X-axis and the Y-axis. Each pixel may include a photoelectric conversion element PD.

Color filters CF1 to CF4 for passing a light of a specific type (e.g., specific wavelength band) may be respectively formed on the pixel groups PG1 to PG4. For example, the first color filter CF1 may pass a blue light, the second color filter CF2 and the third color filter CF3 may pass a green light, and the fourth color filter CF4 may pass a red light. As illustrated in FIG. 3, as the second color filter CF2 is adjacent to the first color filter CF1 in the X-axis direction and the third color filter CF3 is adjacent to the fourth color filter CF4 in the X-axis direction, the Bayer pattern may be formed. A micro lens ML may be formed on a color filter formed on each pixel.

Figure 4:
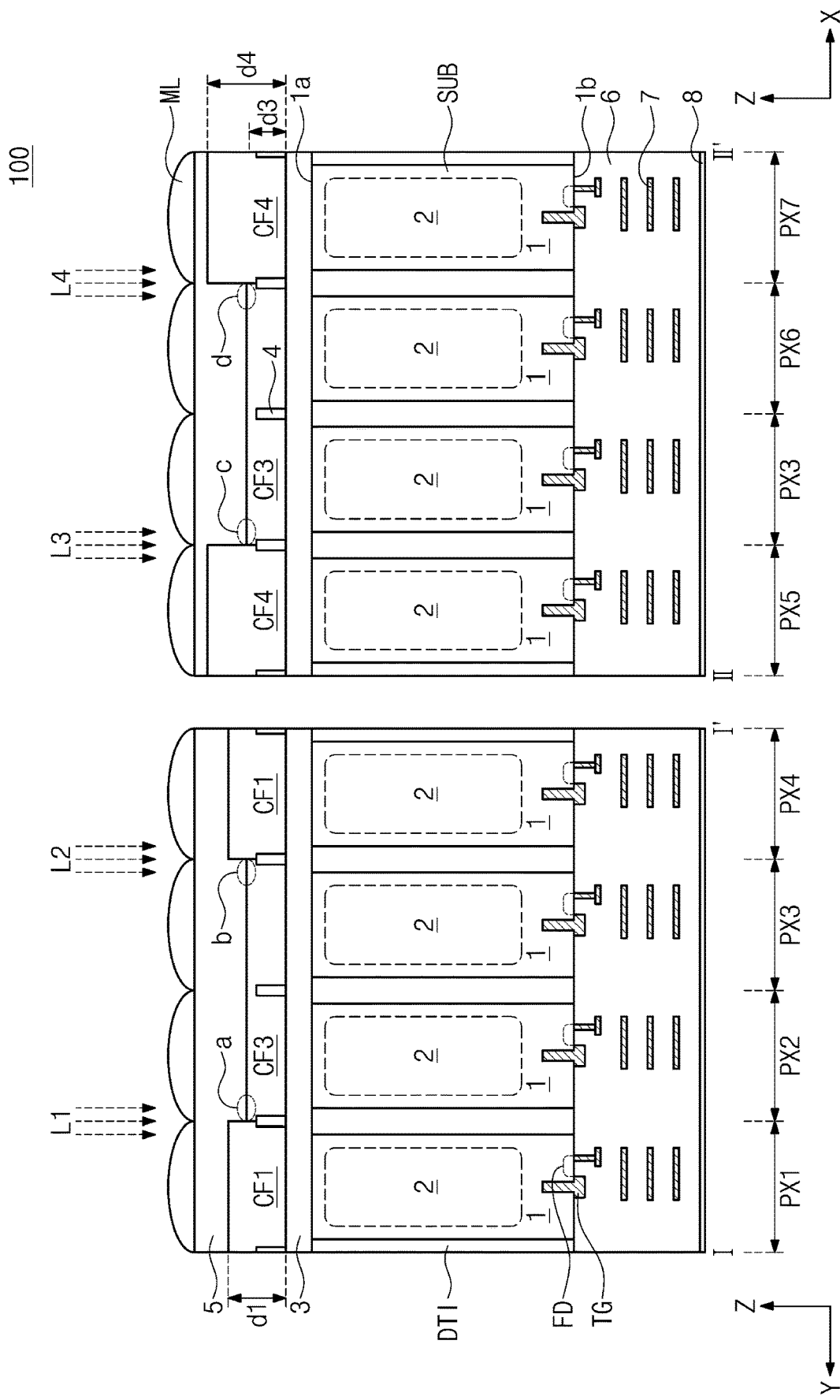
FIG. 4 illustrates a cross-section view of a pixel array taken along line I-I' and line II-II' of FIG. 3.

FIG. 4 illustrates a cross-section view of a pixel array taken along line I-I' and line II-II' of FIG. 3.

The pixel array 110 may include a substrate SUB including a first surface 1a and a second surface 1b facing away from each other. The substrate SUB may include or may be a single crystalline substrate or an epitaxial layer. The substrate SUB may include a region 1 doped by an impurity of a first conductive type (e.g., a P type) and a region 2 doped by an impurity of a second conductive type (e.g., an N type). The first doping region 1 and the second doping region 2 may form the photoelectric conversion element PD of each pixel. When a light is incident on the photoelectric conversion element PD through the micro lens ML and a color filter (e.g., one of CF1 to CF4), electron-hole pairs EHP corresponding to the intensity of absorbed light may be generated.

A fixed charge layer 3 may be formed on the first surface 1a of the substrate SUB. The fixed charge layer 3 may include various kinds of metal oxide and/or metal fluoride. For example, the fixed charge layer 3 may include at least one or more of $Al_2O_3$, HfOX, $SiO_2$, and SiN. An interlayer insulating layer 6 may be formed on the second surface 1b of the substrate SUB. For example, the interlayer insulating layer 6 may include a plurality of insulating layers (which may be referred to as sub-layers). The interlayer insulating layer 6 may be covered with a passivation layer 8. For example, the passivation layer 8 may include or may be a silicon nitride layer, for example.

Meanwhile, each of pixels PX1 to PX7 may include a floating diffusion region FD and a transmission transistor TG. In addition, although not illustrated for brevity of illustration, each of pixels PX1 to PX7 may further include a reset transistor, a driving transistor, and a selection transistor. The pixels PX1 to PX7 may be separated from each other by a deep trench isolator. When a transmission signal is applied to a gate electrode of the transmission transistor TG, the transmission transistor TG may be turned on, and thus, charges generated in the first doping region 1 and the second doping region 2 may move to the floating diffusion region FD. The charges of the floating diffusion region FD may be transmitted to the outside through internal wires 7.

Light shielding patterns 4 may be formed on the fixed charge layer 3. The light shielding patterns 4 may include tungsten, titanium, etc. The light shielding patterns 4 may prevent the crosstalk between adjacent pixels. In a plan view, the light shielding patterns 4 may have a grid shape. The light shielding patterns 4 may include, for example, linear patterns parallel to each other and extending in the X-axis direction, and linear patterns parallel to each other and extending in the Y-axis direction. The color filters CF1 to CF4 may be formed between the light shielding patterns 4 on the fixed charge layer 3. A planarization layer 5 may be formed on the color filters CF1 to CF4, and the micro lenses ML may be formed on the planarization layer 5. Planarization layer 5 may be formed, for example, of a transparent material, such as an electrically-insulative material. The light shielding patterns 4 that are for preventing a light passing a specific color filter from influencing any other color filter may fail to prevent an influence due to a height or thickness difference between the color filters CF1 to CF4.

In an embodiment, it is assumed that a first light L1 is incident between the first pixel PX1 and the second pixel PX2, a second light L2 is incident between the third pixel PX3 and the fourth pixel PX4, a third light L3 is incident between the fifth pixel PX5 and the third pixel PX3, and a fourth light L4 is incident between the sixth pixel PX6 and the seventh pixel PX7. The lights L1 to L4 may come from one light source (e.g., a natural light) or a plurality of light sources, and it should be understood that this classification is made for convenience sake depending on a location where a light is incident on the pixel array 110 of the image sensor 100.

Because a thickness d1 of the first color filter CF1 or a height of the first color filter CF1 (e.g., a height of a top-most surface of the first color filter CF1) from the fixed charge layer 3 is different from a thickness d3 of the third color filter CF3 or a height of the third color filter CF3 (e.g., a height of a top-most surface of the third color filter CF3) from the fixed charge layer 3, when the light L1 is incident, a shadow due to the first color filter CF1 of the first pixel PX1 may influence a region "a" of the third color filter CF3 of the second pixel PX2. When the light L2 is incident, a shadow due to the first color filter CF1 of the fourth pixel PX4 may influence a region "b" of the third color filter CF3 of the third pixel PX3.

As in the above description, because a thickness d3 of the third color filter CF3 or a height of the third color filter CF3 (e.g., a height of a top-most surface of the third color filter CF3) from the fixed charge layer 3 is different from a thickness d4 of the fourth color filter CF4 or a height of the fourth color filter CF4 (e.g., a height of a top-most surface of the fourth color filter CF4) from the fixed charge layer 3, when the light L3 is incident, a shadow due to the fourth color filter CF4 of the fifth pixel PX5 may influence a region "c" of the third color filter CF3 of the third pixel PX3. When the light L4 is incident, a shadow due to the fourth color filter CF4 of the seventh pixel PX7 may influence a region "d" of the third color filter CF3 of the sixth pixel PX6.

Due to thickness or height differences of the color filters CF1 to CF4 described above, intensities of lights actually incident on respective pixels may be different, thereby causing a decrease in a dynamic range and/or a fixed pattern noise. Accordingly, the ISP front end block 16 (refer to FIG. 1) of the present disclosure is configured to consider the crosstalk according to height differences of the color filters CF1 to CF4 in dark level compensation. For example, the ISP front end block 16 may multiply a code level including a signal level and a dark level of image data by a calibration value for compensating the crosstalk. In addition, even in the case of compensating a dark level, the ISP front end block 16 may multiply a code level including a dark level of dark level data by calibration data for compensating the crosstalk.

An embodiment is illustrated as the fourth color filter CF4 passing a red light is the thickest and the third color filter CF3 passing a green light is the thinnest, but the present disclosure is not limited thereto. For example, a thickness of a color filter may be variously changed depending on an order in which the color filter is formed. For example, a color filter early formed may be relatively thin, and a color filter late formed may be relatively thick.

Figure 5:
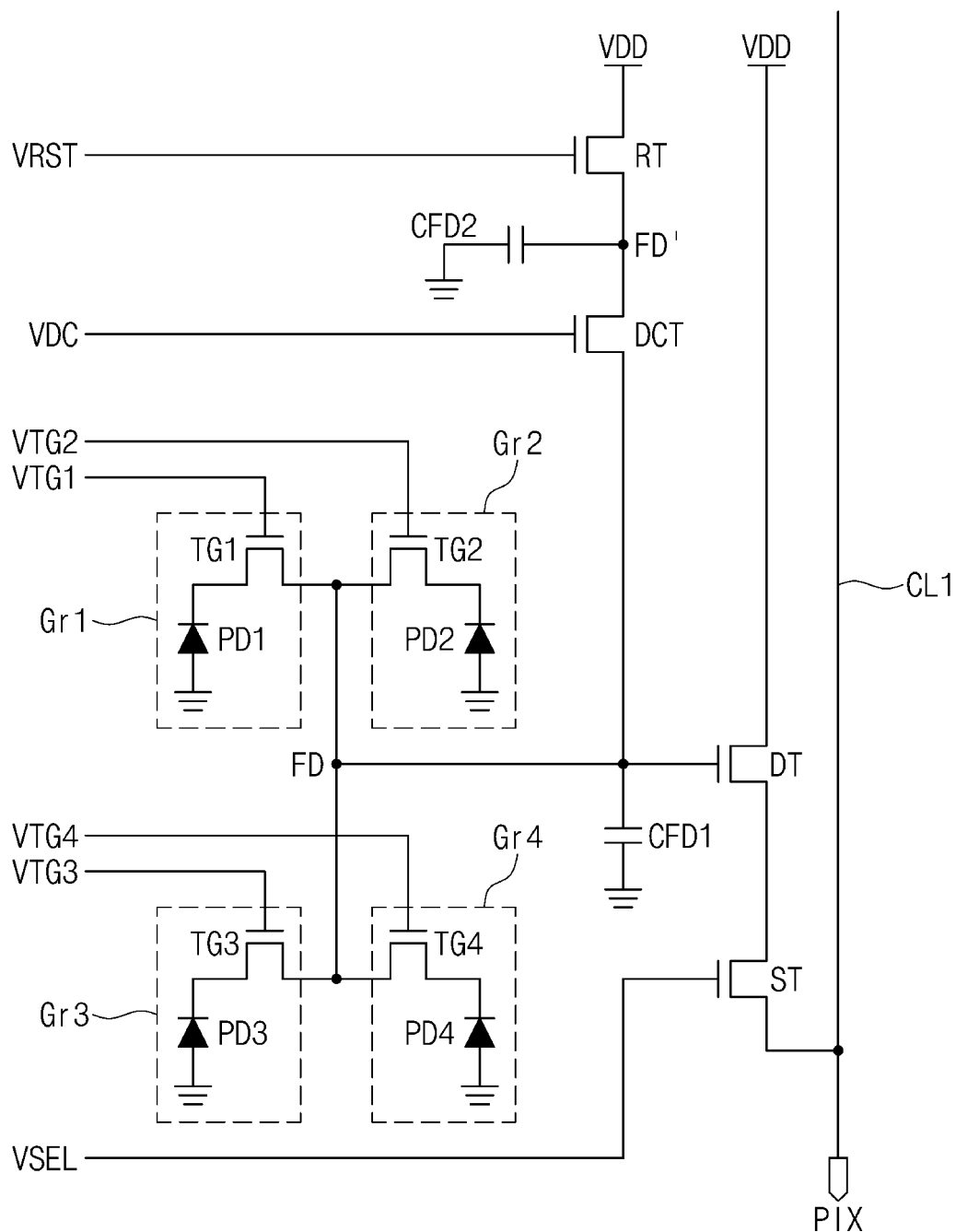
FIG. 5 illustrates an exemplary circuit diagram of one of the pixel groups of FIG. 2.

FIG. 5 illustrates an exemplary circuit diagram of one of the pixel groups PG1 to PG4 of FIG. 2. In an embodiment, the third pixel group PG3 may include photoelectric conversion elements PD1 to PD4, transmission transistors TG1 to TG4, a dual conversion transistor DCT, a reset transistor RT, a driving transistor DT, and a selection transistor ST. A first pixel Gr1 may include the first photoelectric conversion element PD1 and the first transmission transistor TG1. A second pixel Gr2 may include the second photoelectric conversion element PD2 and the second transmission transistor TG2, and each of the remaining pixels Gr3 and Gr4 may include similar components/elements. The first to fourth pixels Gr1 to Gr4 may share the dual conversion transistor DCT, the reset transistor RT, the driving transistor DT, the selection transistor ST, and a floating diffusion region FD.

When the dual conversion transistor DCT is turned off, the floating diffusion region FD may be connected with a first floating diffusion capacitor CFD1. When the dual conversion transistor DCT is turned on, the floating diffusion region FD may be connected with a second floating diffusion capacitor CFD2 as well as the first floating diffusion capacitor CFD1. For example, the floating diffusion capacitors CFD1 and CFD2 may be a parasitic capacitor and/or a capacitor element. The second floating diffusion capacitor CFD2 may be provided to prevent saturation.

The transmission transistors TG1 to TG4 may transmit charges generated by the photoelectric conversion elements PD1 to PD4 to the floating diffusion region FD or a floating diffusion region FD' extended when the dual conversion transistor DCT is turned on. For example, first ends of the transmission transistors TG1, TG2, TG3, and TG4 may be respectively connected with the photoelectric conversion elements PD1, PD2, PD3, and PD4, and second ends thereof may be connected in common with the floating diffusion region FD. The transmission transistors TG1, TG2, TG3, and TG4 may be respectively controlled by transmission signals VTG1, VTG2, VTG3, and VTG4 received from the row driver 120 (refer to FIG. 1).

The floating diffusion region FD or the extended floating diffusion region FD' may integrate charges corresponding to the amount of incident light. The floating diffusion region FD may have a capacitance corresponding to the first floating diffusion capacitor CFD1. During a time when the transmission transistors TG1, TG2, TG3, and TG4 are respectively turned on by the transmission signals VTG1, VTG2, VTG3, and VTG4, charges provided from the photoelectric conversion elements PD1, PD2, PD3, and PD4 may be integrated at the floating diffusion region FD or the extended floating diffusion region FD'. The floating diffusion region FD may be connected with a gate terminal of the driving transistor DT that operates as a source follower amplifier. As a result, a voltage potential corresponding to charges integrated at the floating diffusion region FD may be formed.

The reset transistor RT may be turned on by a reset signal VRST and may provide a reset voltage (e.g., a power supply voltage VDD) to the floating diffusion region FD or the extended floating diffusion region FD'. As a result, charges integrated at the floating diffusion region FD or the extended floating diffusion region FD' may move to a terminal for the power supply voltage VDD, and a voltage of the floating diffusion region FD or the extended floating diffusion region FD' may be reset.

The driving transistor DT may amplify a change of an electrical potential of the floating diffusion region FD or the extended floating diffusion region FD' and may generate a voltage (i.e., a pixel signal PIX) corresponding to a result of the amplification. The selection transistor ST may be driven by a selection signal VSEL and may select a pixel to be read in units of a row. As the selection transistor ST is turned on, the pixel signal PIX may be output through a column line CL.

Figure 6A:
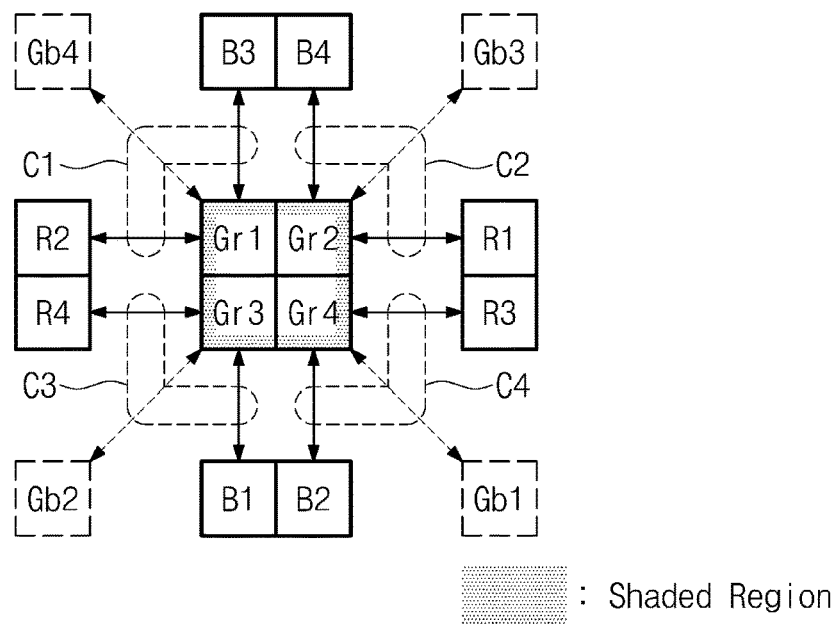
FIGS. 6A and 6B conceptually illustrate an influence of peripheral pixels on a pixel group of an image sensor of FIGS. 2 to 4.
Figure 6B:
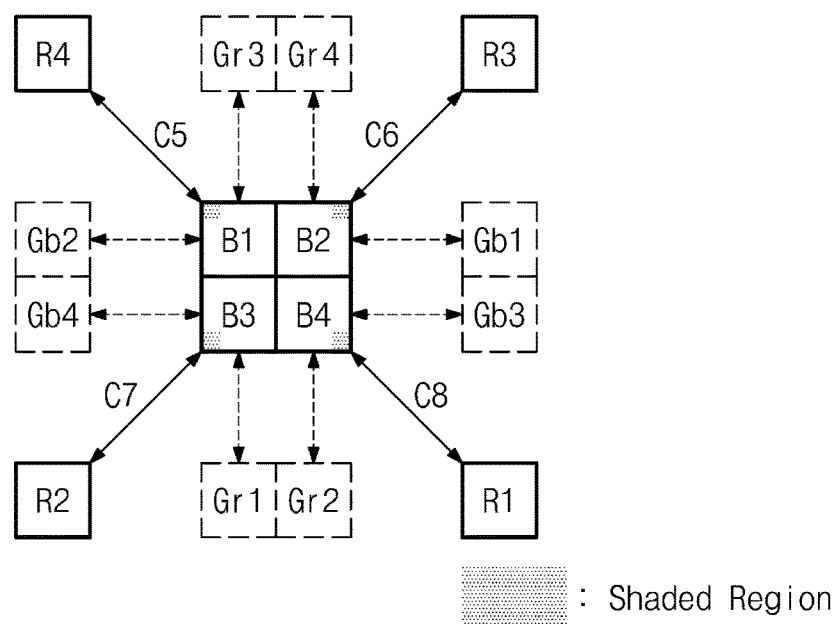

FIGS. 6A and 6B conceptually illustrate an influence of peripheral pixels on a pixel group of an image sensor of FIGS. 2 to 4.

First, referring together to FIGS. 2 to 4 and 6A, each of pixels Gr1 to Gr4 constituting the third pixel group PG3 may be influenced by a color filter covering at least one pixel adjacent thereto. For example, a thickness (or a height) of the third color filter CF3 covering the pixels Gr1 to Gr4 may be smaller than thicknesses (or heights) of other color filters adjacent thereto. For example, the pixel Gr1 may be influenced by a shadow due to the fourth color filter CF4 covering the pixel R2 and a shadow due to the first color filter CF1 covering the pixel B3. In an embodiment, the crosstalk that the pixel Gr1 experiences is marked by "C1".

As in the above description, the remaining pixels Gr2 to Gr4 may be influenced by adjacent color filters, and crosstalk that the pixels Gr2, Gr3, and Gr4 experience may be "C2", "C3", and "C4". Because surrounding environments (i.e., color filter heights) of the pixels Gr1 to Gr4 are identical, influences that the pixels Gr1 to Gr4 experience may be roughly identical. That is, values of the crosstalk C1 to C4 may be roughly identical. However, because a height of color filters covering the pixels Gb1 to Gb4 is identical to the height of the third color filter CF3 covering the pixels Gr1 to Gr4, there may be no influence by the pixels Gb1 to Gb4 due to a thickness difference of the color filters.

Next, referring together to FIGS. 2 to 4 and 6B, a height of the first color filter CF1 covering pixels B1 to B4 is greater than a height of color filters covering the pixels Gr1 to Gr4 and Gb1 to Gb4. Accordingly, a signal associated with the pixels B1 to B4 may not be influenced by the color filters covering the pixels Gr1 to Gr4 and Gb1 to Gb4. However, a height of the first color filter CF1 covering the pixels B1 to B4 may be smaller than a height of color filters covering pixels R1 to R4. Accordingly, the pixel B1 may be influenced slightly by a color filter covering the pixel R4. In an embodiment, the crosstalk that the pixel B1 experiences is marked by "C5". As in the above description, the remaining pixels B2, B3, and B4 may be respectively influenced by color filters covering the pixels R3, R2, and R4 (C6 to C8).

According to the above description, the pixels Gb1 to Gb4 of the second pixel group PG2 and the pixels Gr1 to Gr4 of the third pixel group PG3 may be influenced greatest by color filters covering surrounding pixels. The pixels B1 to B4 of the first pixel group PG1 may be influenced slightly by color filters covering surrounding pixels R1 to R4, and the pixels R1 to R4 of the fourth pixel group PG4 may not be influenced by color filters covering surrounding pixels. According to the present disclosure, the crosstalk due to a thickness (or height) difference of color filters is compensated with respect to a dark level of a dark level offset signal output from the optical black region 110b (refer to FIG. 2). As a result, the fixed pattern noise may be removed.

Figure 7:
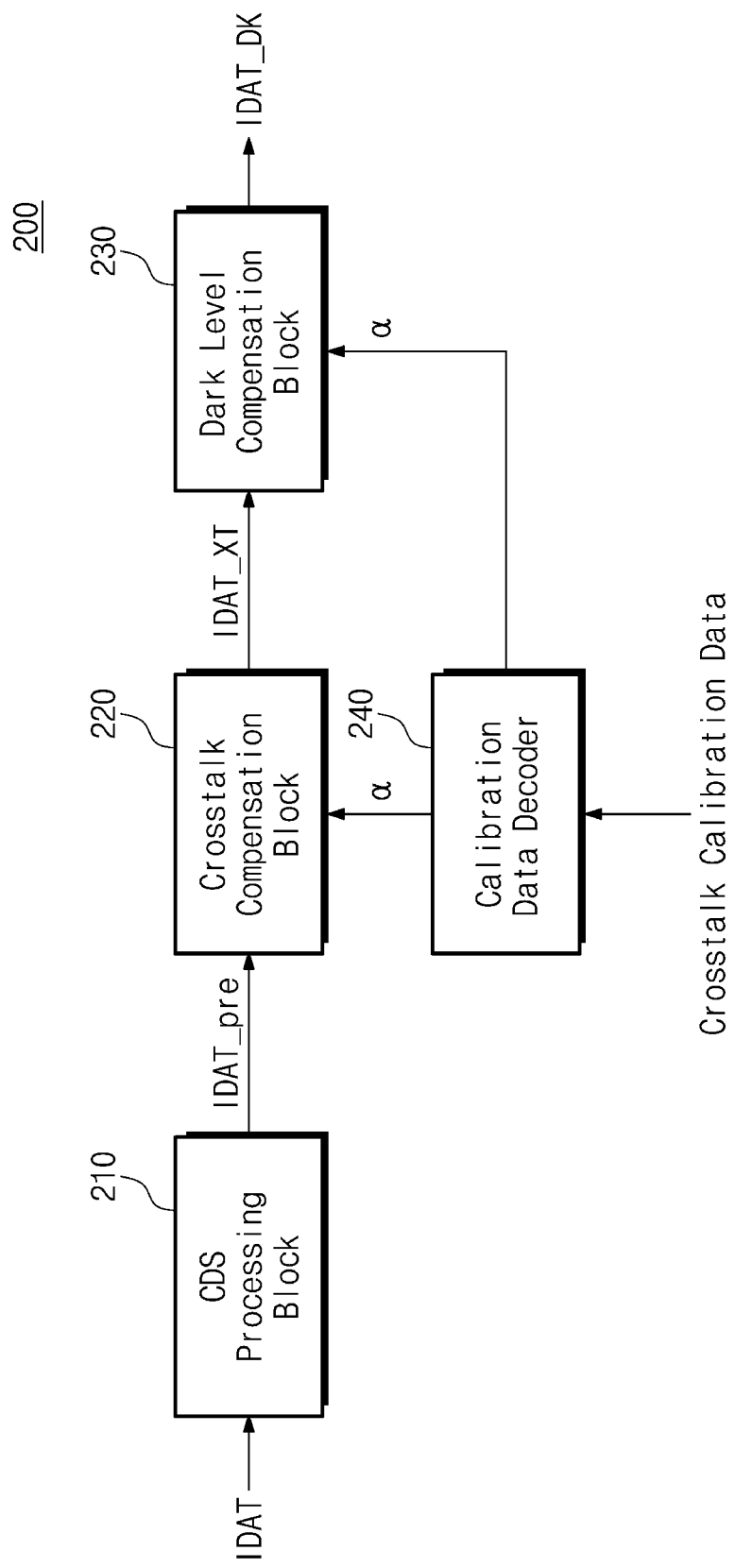
FIG. 7 illustrates an exemplary configuration of an ISP front end block according to an embodiment of the present disclosure.

FIG. 7 illustrates an exemplary configuration of the ISP front end block 16 according to an embodiment of the present disclosure. For example, an ISP front end block 200 may be implemented with the ISP front end block 16 of FIG. 1. The ISP front end block 200 may include a CDS processing block 210, a crosstalk compensation block 220, a dark level compensation block 230, and a calibration data decoder 240.

The CDS processing block 210 is configured to receive and process the image data IDAT output from the image sensor 100 (refer to FIG. 2). For example, the CDS processing block 210 may allow data of a specific range to be used as valid data (or effective data) within an output range of the image data IDAT. For example, the CDS processing block 210 may determine whether to process data of the image data IDAT, which belong to regions of a specific value or of a range between a certain amount more and a certain amount less of the specific value, at the same time.

Figure 8A:
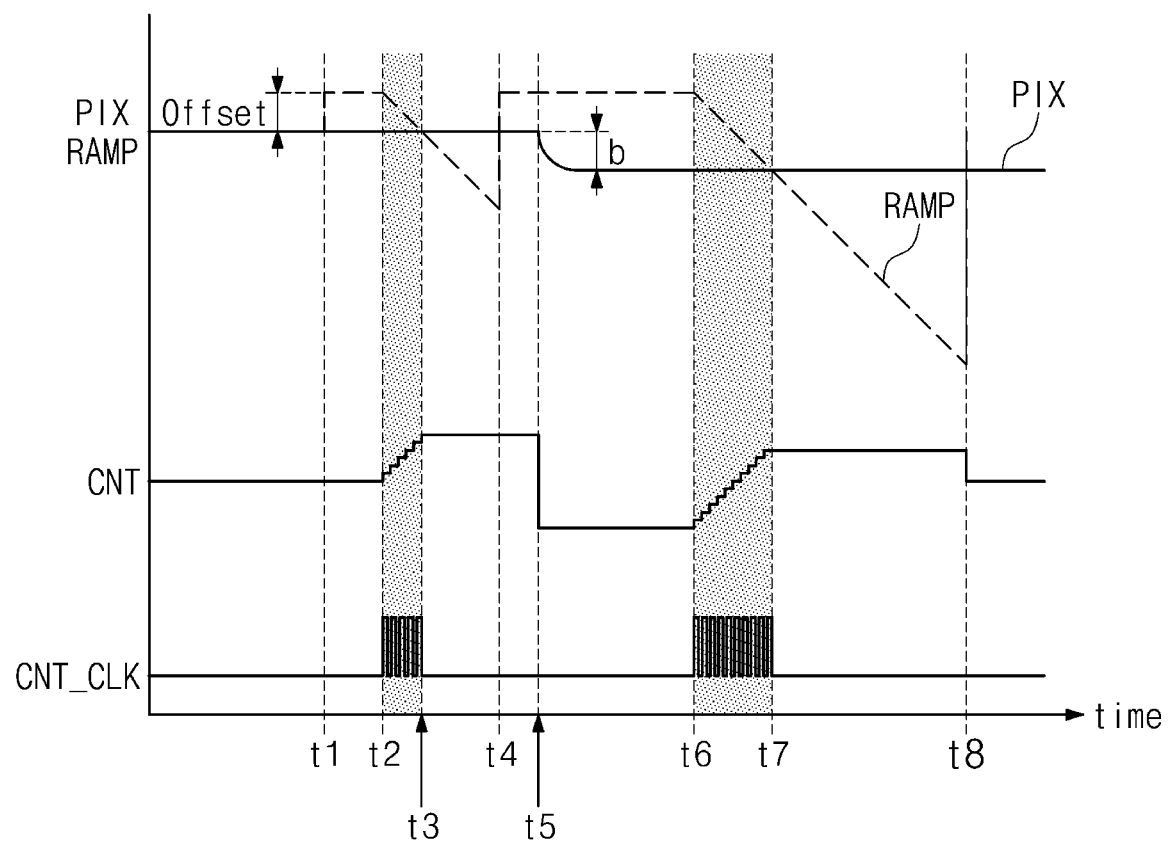
FIGS. 8A and 8B illustrate schematic operations of correlated double sampling.

In an embodiment, the CDS processing block 210 may process the image data IDAT output in a low-illuminance environment. To remove a negative value of the image data IDAT, the CDS processing block 210 may add an ADC offset value (e.g., a constant such as 128) to the image data IDAT. Referring to FIG. 8A indicating a schematic operation of correlated double sampling, because the amount of charges integrated at the floating diffusion region FD or FD' (refer to FIG. 5) is small in the low-illuminance environment, the variations "b" in the pixel signal PIX according to the turn-on of the transmission transistors TG1 to TG4 (refer to FIG. 5) may be significantly small. In this case, an operation of adding a specific value to the image data IDAT may be required to remove a negative value included in the image data IDAT.

In one embodiment, the CDS processing block 210 may determine a minimum value maxpos value (refer to FIG. 9) for processing the image data IDAT to black. For example, the CDS processing block 210 may invert a sign of the image data IDAT having a negative value and may determine the complement of a value of the image data IDAT having the inverted sign as the minimum value maxpos value. For example, the minimum value maxpos value may have a value approximate to "2047" being a maximum value of the 11-bit image data IDAT.

Figure 8B:
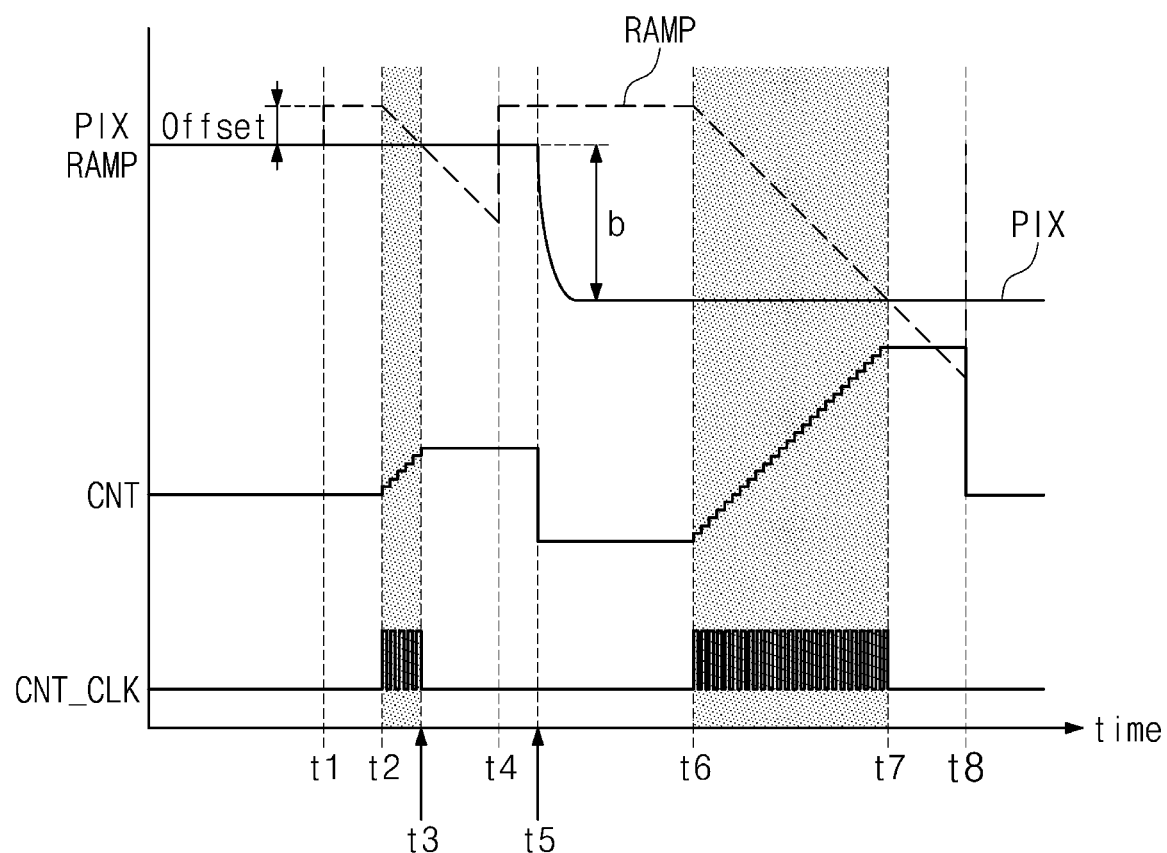

In an embodiment, the CDS processing block 210 may process the image data IDAT output in a high-illuminance environment. Referring together to FIG. 8B indicating a schematic operation of correlated double sampling, because the amount of charges integrated at the floating diffusion region FD or FD' (refer to FIG. 5) is great in the high-illuminance environment, the variations "b" in the pixel signal PIX according to the turn-on of the transmission transistors TG1 to TG4 (refer to FIG. 5) may be significantly great. In this case, the CDS processing block 210 may determine a boundary value clip_up_value (refer to FIG. 9) for processing the image data IDAT to white. A range of the boundary value clip_up_value or more may be considered as a saturation state.

In addition, in the case where the image data IDAT are distorted due to a light entering the optical black region 110b (refer to FIG. 2) (in which a light is not blocked normally) in the high-illuminance environment, the CDS processing block 210 may perform various operations to calibrate the distortion.

To describe an operation of the CDS processing block 210, a correlated double sampling operation of comparing the pixel signal PIX and the ramp signal RAMP and generating a counting value CNT as a result of counting a comparison result by using a counting clock CNT_CLK is schematically illustrated in FIGS. 8A and 8B. However, because the correlated double sampling itself is well known, additional description will be omitted to avoid redundancy.

Returning to FIG. 7, the crosstalk compensation block 220 may receive image data IDAT_pre pre-processed by the CDS processing block 210. The crosstalk compensation block 220 may multiply a code level of the image data IDAT_pre by a calibration value α for compensating the crosstalk due to a height (or thickness) difference of color filters. As a result, as well as a signal level included in the code level, a dark level may also be multiplied by the calibration value α. For example, as described with reference to FIG. 6, the pixels Gr1 to Gr4 of the third pixel group PG3 may be significantly influenced by color filters covering adjacent pixels. Accordingly, the code level of the image data IDAT may be different from an intended original value, thereby causing a decrease in a dynamic range. For example, the calibration value α expressed by Equation 1 below and the code level of the image data IDAT_pre may be multiplied together to make the reduced dynamic range again wide. The crosstalk compensation block 220 may output crosstalk-compensated image data IDAT_XT.

$$\alpha = \frac{(\text{Value\_Gr1} + \text{Value\_Gr2} + \text{Value\_Gr3} + \text{Value\_Gr4})/4}{\text{Value\_Gri}} \quad \text{[Equation 1]}$$

In Equation 1 above, "Value_Gr1" indicates a pixel value (i.e., a code level) of image data output from the pixel Gr1, and "Value_Gr2" indicates a pixel value of image data output from the pixel Gr2. "Value_Gr3" indicates a pixel value of image data output from the pixel Gr3, and "Value_Gr4" indicates a pixel value of image data output from the pixel Gr4. "Value_Gri" (i being 1 to 4) indicates a pixel value of image data output from a pixel targeted for crosstalk compensation.

The dark level compensation block 230 may subtract dark level data from the image data IDAT_XT to generate dark level-compensated image data IDAT_DK. For example, the dark level data that are a digital signal corresponding to a dark level offset signal output from the optical black region 110b (refer to FIG. 2) may include a dark level. However, the dark level compensation block 230 may not subtract the dark level data from the image data IDAT_XT simply and may also apply the calibration value α to the dark level data.

However, in the case where there is no crosstalk compensation for the dark level data, a decrease in a dynamic range may be inevitable. The reason is that a calibration value is applied even to a dark level included in a code level of image data when crosstalk compensation is performed on image data and thus a dynamic range decreases as much as the dark level of the image data. According to the dark level compensation of the present disclosure, the multiplied dark level of the crosstalk-compensated image data IDAT_XT and the dark level of the dark level data may completely cancel out, and thus, the dark level may be removed from the code level of the image data IDAT.

The dark level compensation block 230 may add a pedestal value having a specific value (e.g., a constant such as 64) to the dark level-compensated image data IDAT_DK. For example, the added pedestal value may be for preventing the dark level-compensated image data IDAT_DK from having a negative value. After performing a set of operations described above, the dark level compensation block 230 may remove the dark level-compensated image data IDAT_DK. For example, the dark level compensation block 230 may cut the dark level-compensated image data IDAT_DK so as to be appropriate for processing of the image signal processor 18 (refer to FIG. 1). As a result, 10-bit image data IDAT_DK may be obtained, and the obtained image data IDAT_DK may be provided to the image signal processor 18 (refer to FIG. 2).

The calibration data decoder 240 may receive crosstalk calibration data from the outside (e.g., a memory). For example, calibration values that are values measured in advance may be compressed, and the compressed values may be stored in an external memory as crosstalk calibration data. The calibration data decoder 240 may decode the crosstalk calibration data and may output the calibration value α corresponding to each of pixels constituting the pixel array 110 (refer to FIG. 2). For example, the crosstalk calibration data may include a representative value (e.g., an average value, a maximum value, or a minimum value) of calibration values of pixels in each row (or column) of the pixel array 110, and the calibration data decoder 240 may generate the calibration values of the pixels in each row (or column) through an interpolation scheme or the like.

However, in another embodiment, the calibration values of the pixels in each row (or column) of the pixel array 110 may be received directly from the outside (e.g., a memory). In this case, the calibration values may be values measured in advance and may be provided to the ISP front end block 200 without an encoding and decoding process. Therefore, in the embodiment in which calibration values are received directly from the outside, the calibration data decoder 240 illustrated in FIG. 7 may not be required.

Figure 9:
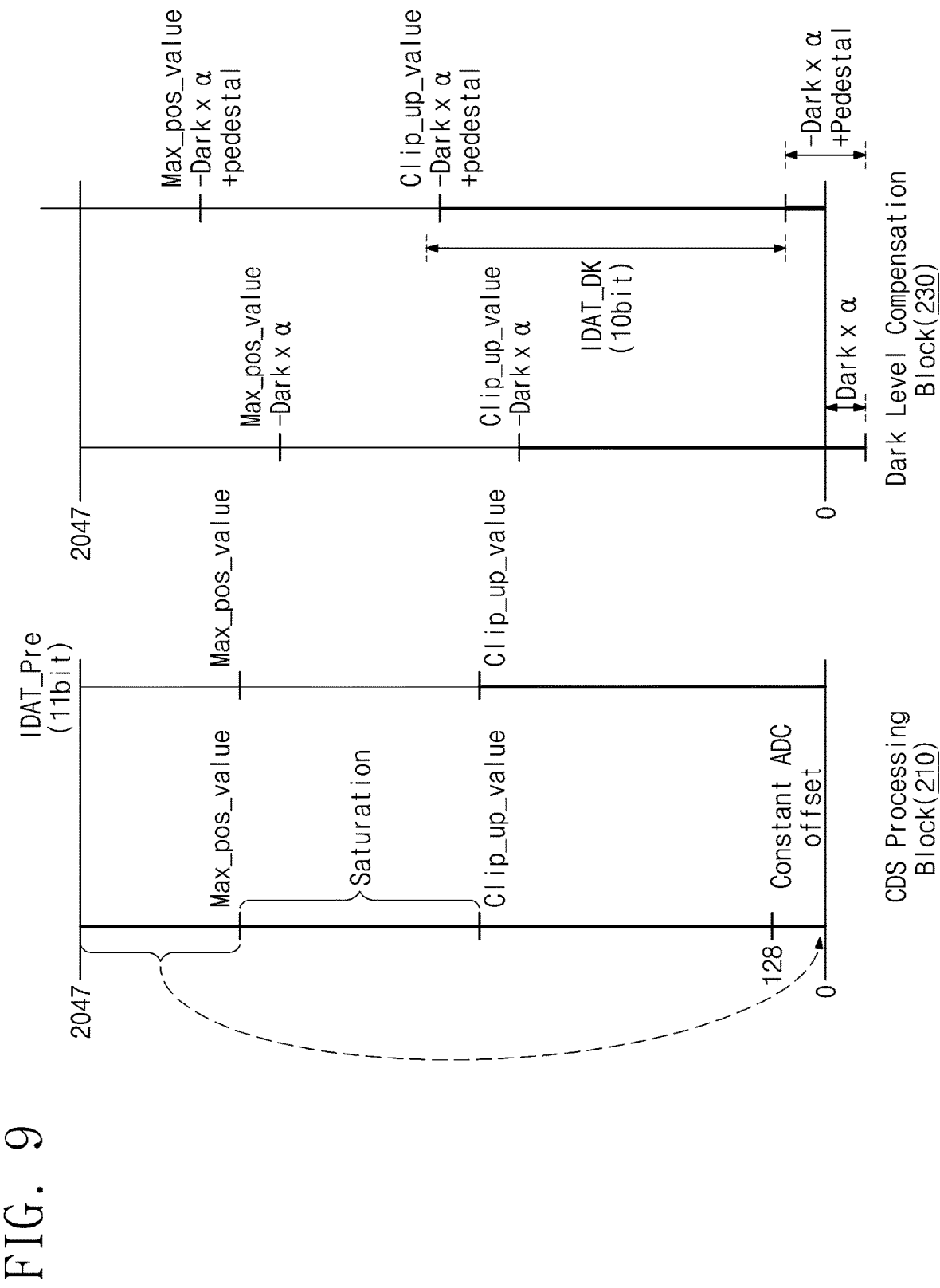
FIG. 9 schematically illustrates image data processed by an ISP front end block of FIG. 7.

FIG. 9 schematically illustrates image data processed by the ISP front end block 200 of FIG. 7.

Referring together to FIGS. 7 and 9, the CDS processing block 210 may add an ADC offset value to the image data IDAT received from the image sensor 14 (refer to FIG. 2). The CDS processing block 210 may determine Max_pos value for black processing of a pixel when the image data IDAT includes a negative value and may determine Clip_up_value for white processing of the image data IDAT in a high-illuminance environment. Although not illustrated in the drawings, the code level of the image data IDAT_pre output from the CDS processing block 210 may be multiplied by the calibration value a, and thus, the crosstalk due to a thickness (or height) of color filters may be compensated.

The dark level compensation block 230 may compensate a dark level with respect to the image data IDAT_pre. For example, in dark level compensation, the dark level compensation block 230 may also multiply a subtracted dark level offset signal by the calibration value α. This is expressed by "Dark×α" in FIG. 9. The dark level compensation block 230 may add a pedestal value to the dark level-compensated image data IDAT_DK and may output the 10-bit image data IDAT_DK appropriate for processing of the image signal processor 18.

Figure 10:
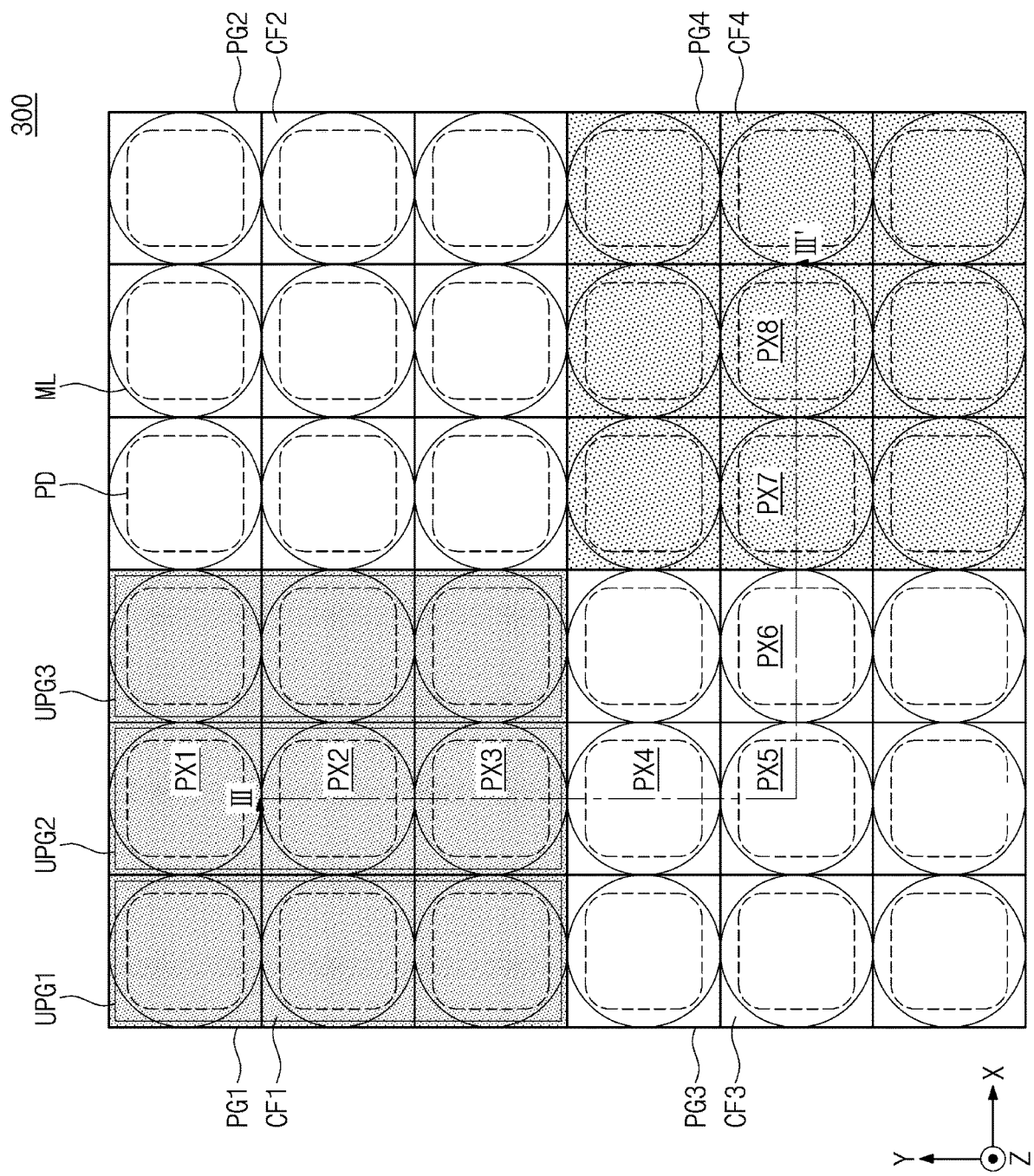
FIG. 10 illustrates a plan view of an image sensor of FIG. 1, according to one embodiment.

FIG. 10 illustrates a plan view of an image sensor of FIG. 1, according to one embodiment. An image sensor 300 may include the pixel groups PG1 to PG4, each of which includes unit pixel groups UPG1 to UPG3. The pixel groups PG1 to PG4 may be repeatedly formed on a substrate of the image sensor 300 along the X-axis and the Y-axis. Each of the pixel groups PG1 to PG4 may include 3×3 pixels arranged along the X-axis and the Y-axis, but the present disclosure is not limited thereto. Each pixel may include the photoelectric conversion element PD.

The arrangement of the unit pixel groups UPG1 to UPG3 will be described with reference to the first pixel group PG1. Each of the unit pixel groups UPG1 to UPG3 may include 1×3 pixels arranged along the X-axis and the Y-axis. A unit pixel group may be defined as a set of pixels sharing the same floating diffusion region. For example, even though unit pixel groups belong to the same pixel group, a floating diffusion region shared by pixels belonging to one unit pixel group may not be shared by pixels belonging to another unit pixel group. The unit pixel groups UPG1 to UPG3 may be adjacent to each other in the X-axis direction. Accordingly, as illustrated in FIG. 10, in the case where one pixel group includes three unit pixel groups, one pixel group may include 3×3 pixels arranged along the X-axis and the Y-axis.

The color filters CF1 to CF4 for passing a light of a specific wavelength band may be respectively formed on the pixel groups PG1 to PG4. As in the embodiment of FIG. 3, the first color filter CF1 may pass a blue light, the second and third color filters CF2 and CF3 may pass a green light, and the fourth color filter CF4 may pass a red light. Micro lenses corresponding to pixels may be disposed on each of the color filters.

Figure 11:
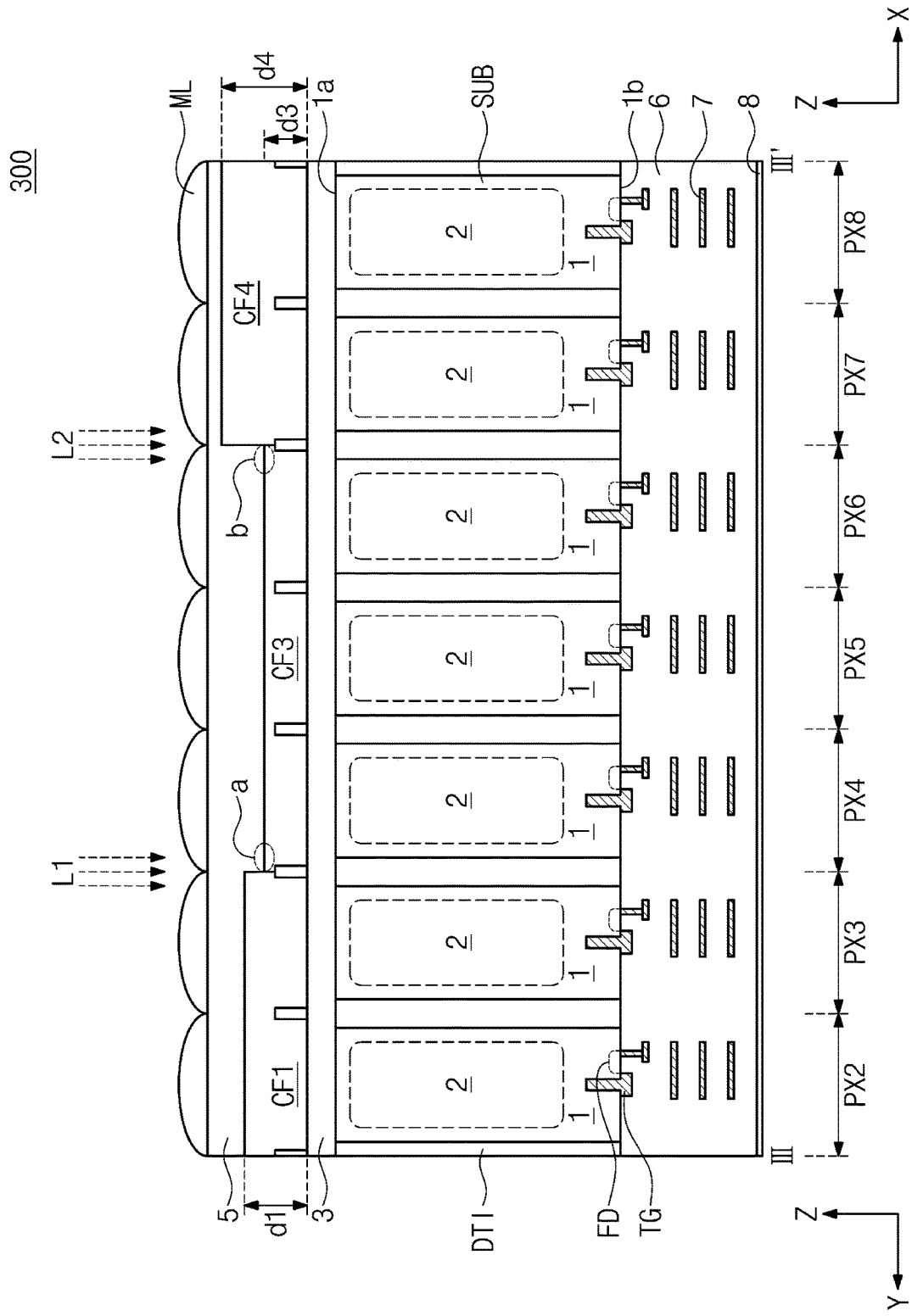
FIG. 11 is a cross-sectional view of an image sensor taken along line III-III' of FIG. 10.

FIG. 11 is a cross-sectional view of an image sensor taken along line of FIG. 10. The cross-sectional view of FIG. 11 is roughly similar to the cross-sectional view of FIG. 4, and pixel structures are similar to those of FIG. 4. Thus, additional description associated with the pixel structure will be omitted to avoid redundancy. Referring to FIG. 11, a light L1 may be incident between the third pixel PX3 and the fourth pixel PX4, and a light L2 may be incident between the sixth pixel PX6 and the seventh pixel PX7. Of course, the lights L1 to L2 may come from one light source or a plurality of light sources, and it may be understood that this classification is made for convenience sake.

Because a thickness d1 of the first color filter CF1 or a height of the first color filter CF1 from the fixed charge layer 3 is different from a thickness d3 of the third color filter CF3 or a height of the third color filter CF3 from the fixed charge layer 3, a signal output from the fourth pixel PX4 may be influenced by the first color filter CF1. A region where the fourth pixel PX4 is influenced by the first color filter CF1 is marked by "a". As in the above description, because a thickness d4 of the fourth color filter CF4 or a height of the fourth color filter CF4 from the fixed charge layer 3 is different from the thickness d3 of the third color filter CF3 or the height of the third color filter CF3 from the fixed charge layer 3, a signal output from the sixth pixel PX6 may be influenced by the fourth color filter CF4. A region where the sixth pixel PX6 is influenced by the fourth color filter CF4 is marked by "b".

However, unlike the image sensor 100 illustrated in FIG. 2, even though pixels belong to one pixel group (i.e., PG3), because environments surrounding the pixels are different, the degrees of crosstalk that the respective pixels experience may be different. For example, because a thickness (or a height) of the first color filter CF1 influencing the fourth pixel PX4 and a thickness (or a height) of the fourth color filter CF4 influencing the sixth pixel PX6 are different, the crosstalk that the fourth pixel PX4 experiences may be different from the crosstalk that the sixth pixel PX6 experiences.

In addition, because a pixel (e.g., PX5) disposed at the center from among pixels of the third pixel group PG3 is not influenced by adjacent color filters, the crosstalk due to a height (or thickness) difference of color filters may not occur at the pixel PX5. Accordingly, various methods for compensating the crosstalk may be considered, which will be more fully described with reference to FIGS. 13 to 15.

Figure 12:
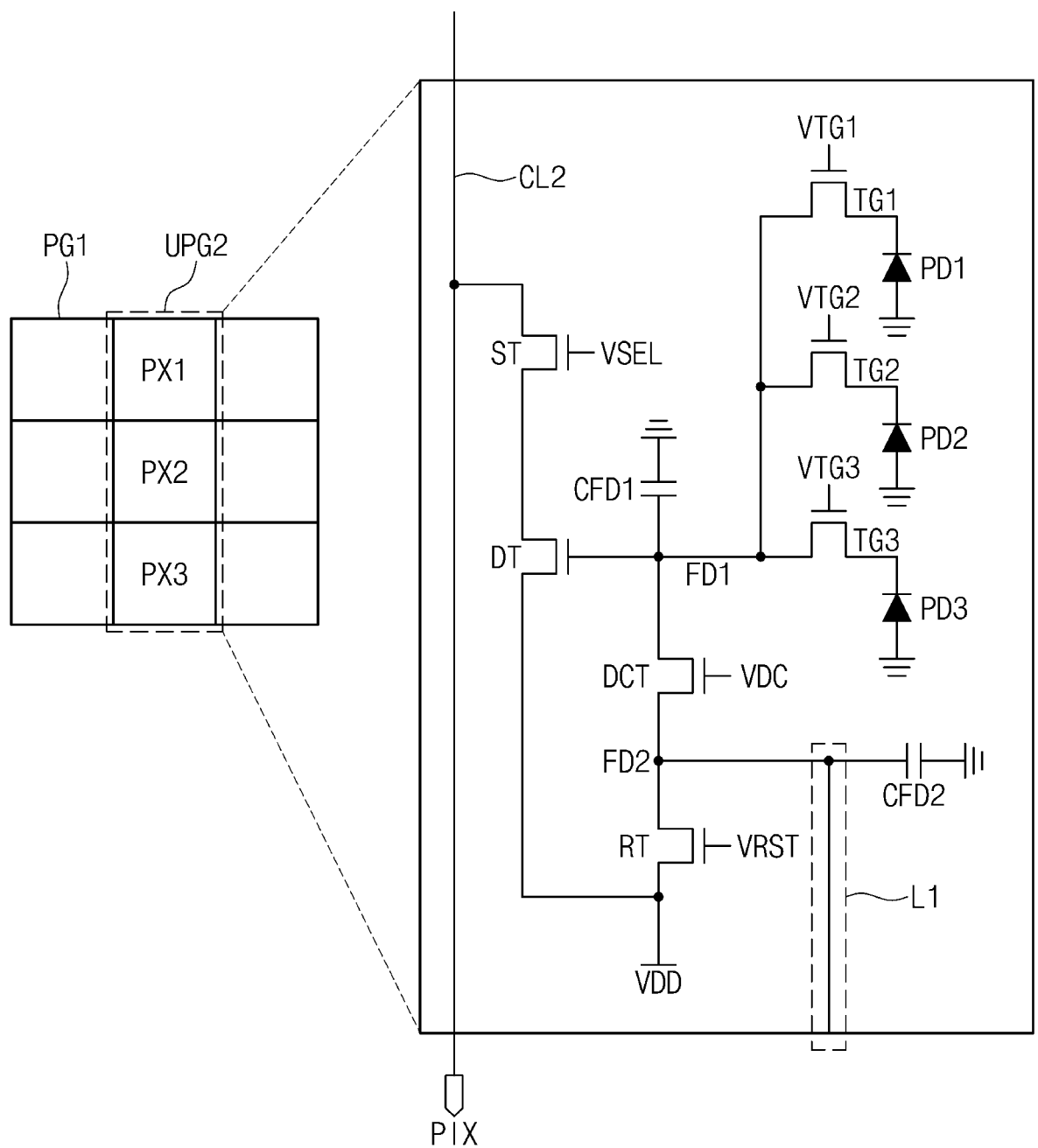
FIG. 12 illustrates an exemplary circuit diagram of one of pixel groups of FIG. 10.

FIG. 12 illustrates an exemplary circuit diagram of one of the pixel groups PG1 to PG4 of FIG. 10. The description will be given exemplifying the second unit pixel group UPG2 of the first pixel group PG1 of FIG. 10. The second unit pixel group UPG2 includes pixels PX1 to PX3. The second unit pixel group UPG2 may include photoelectric conversion elements PD1 to PD3, transmission transistors TG1 to TG3, a dual conversion transistor DCT, a reset transistor RT, a driving transistor DT, and a selection transistor ST. Basic operations of components of each pixel are roughly similar to those described with reference to FIG. 5, and thus, a difference therebetween will be mainly described.

Charges generated by the photoelectric conversion elements PD1 to PD3 may be transmitted to a first floating diffusion region FD1 as the transmission transistors TG1 to TG3 are turned on, and a signal corresponding to a potential of the first floating diffusion region FD1 may be output through a second column line CL2. However, a first floating diffusion capacitor CFD1 of the first floating diffusion region FD1 may be easily saturated. In this case, the first floating diffusion region FD1 and a second floating diffusion region FD2 may be electrically connected by turning on the dual conversion transistor DCT. As a result, a capacitance of the first floating diffusion region FD1 may be extended to a sum of a capacitance of the first floating diffusion region FD1 and a capacitance of the second floating diffusion region FD2.

In addition, the second floating diffusion region FD2 may be electrically connected with a floating diffusion region of an adjacent unit pixel group (not illustrated) through a line L1. In this case, the capacitance of the first floating diffusion region FD1 may be further extended, thus preventing saturation.

Figure 13A:
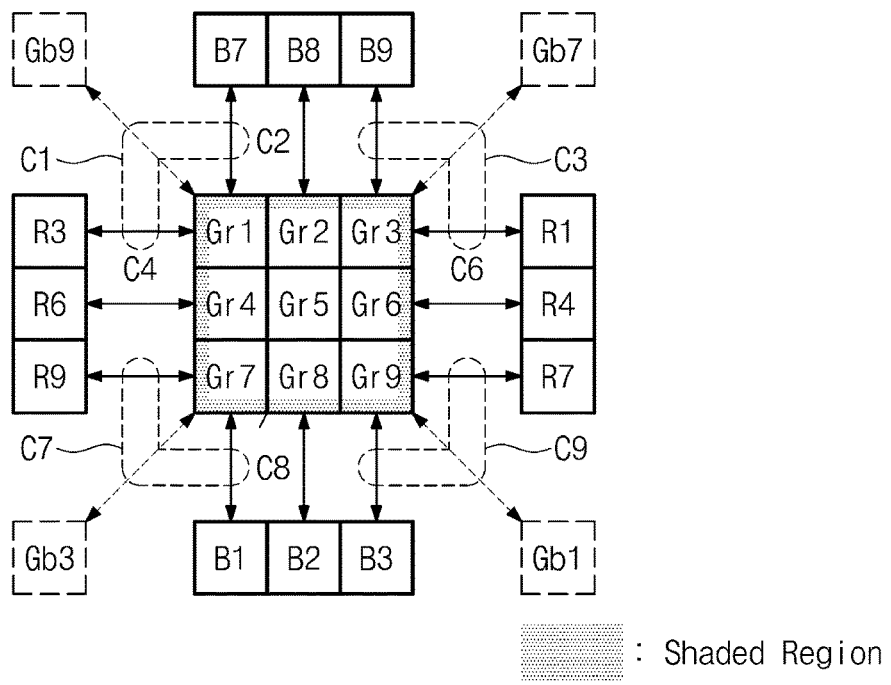
FIGS. 13A and 13B conceptually illustrate an influence of peripheral pixels on a pixel group of an image sensor of FIGS. 10 to 12.
Figure 13B:
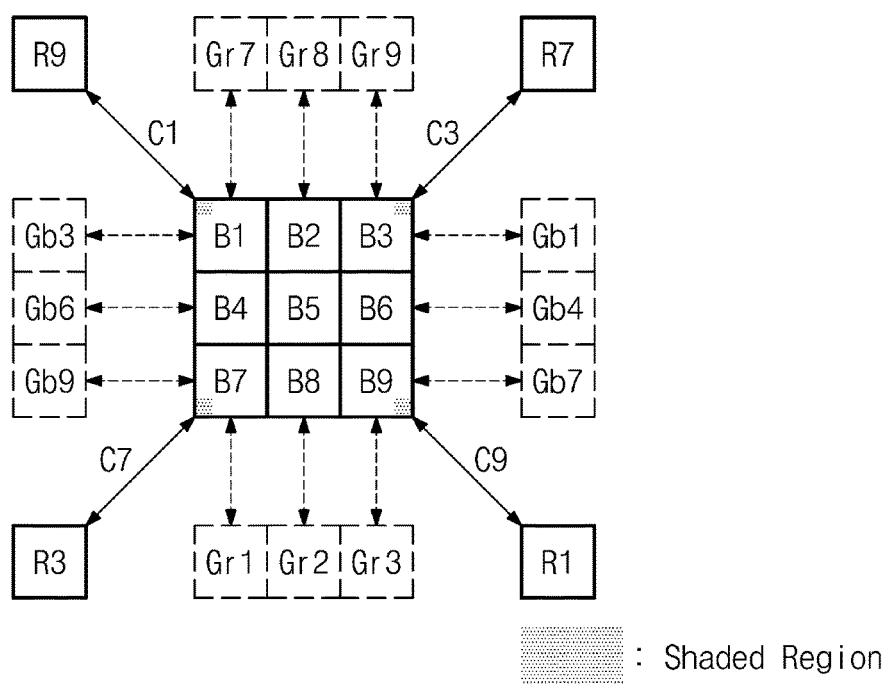

FIGS. 13A and 13B conceptually illustrate an influence of peripheral pixels on a pixel group of an image sensor of FIGS. 10 to 12. Referring together to FIGS. 10, 11, and 13A, each of the remaining pixels other than a fifth pixel Gr5 among pixels Gr1 to Gr9 constituting the third pixel group PG3 may be influenced by a color filter covering at least one pixel adjacent thereto.

First, the pixel Gr1 may be influenced by a color filter passing a red light and covering the pixel R3 and a color filter passing a blue light and covering the pixel B7, and the influence is marked by crosstalk C1. As in the above description, the pixels Gr3, Gr7, and Gr9 may be influenced by color filters passing a red light and color filters passing a blue light, and the influences are marked by crosstalk C3, crosstalk C7, and crosstalk C9, respectively.

The pixel Gr2 may be influenced by a color filter passing a blue light and covering the pixel B8, and the influence is marked by crosstalk C2. The pixel Gr8 may be influenced by a color filter passing a blue light and covering the pixel B2, and the influence is marked by crosstalk C8.

The pixel Gr4 may be influenced by a color filter passing a red light and covering the pixel R6, and the influence is marked by crosstalk C4. The pixel Gr6 may be influenced by a color filter passing a red light and covering the pixel R4, and the influence is marked by crosstalk C6.

The degrees of crosstalk C1, C3, C7, and C9 that the pixels Gr1, Gr3, Gr7, and Gr9 respectively experience may be roughly similar, the degrees of crosstalk C2 and C8 that the pixels Gr2 and Gr8 respectively experience may be roughly similar, and the degrees of crosstalk C4 and C6 that the pixels Gr4 and Gr6 respectively experience may be roughly similar. Accordingly, values of signals output from the pixels Gr1, Gr3, Gr7, and Gr9 having the greatest influence of surrounding color filters may be roughly the smallest, and a signal magnitude may increase in order from values of signals output from the pixels Gr4 and Gr6 to values of signals output from the pixels Gr2 and Gr8. Of course, a value of a signal output from the pixel Gr5 not influenced by surrounding color filters may be roughly the greatest.

Next, referring together to FIGS. 10 and 11 and 13B, a height of the first color filter CF1 covering pixels B1 to B9 is smaller than a height of color filters covering the pixels R1, R3, R7, and R9. Accordingly, the pixel B1 may be influenced slightly by a color filter covering the pixel R9, which is marked by crosstalk C1. As in the above description, other pixels B3, B7, and B9 may be influenced by surrounding color filters, which are respectively marked by crosstalk C3, crosstalk C7, and crosstalk C9.

According to the above description, pixels Gb1 to Gb9 of the second pixel group PG2 and the pixels Gr1 to Gr9 of the third pixel group PG3 may be influenced greatest by color filters covering surrounding pixels. The pixels B1, B3, B7, and B9 of the first pixel group PG1 may be influenced slightly by color filters covering surrounding pixels R1, R3, R7, and R9, and the pixels R1 to R9 of the fourth pixel group PG4 may not be influenced by color filters covering surrounding pixels. According to the present disclosure, crosstalk due to a thickness (or height) difference of color filters is compensated with respect to a dark level measured by the optical black region 110b (refer to FIG. 2). As a result, the fixed pattern noise may be removed.

Figure 14A:
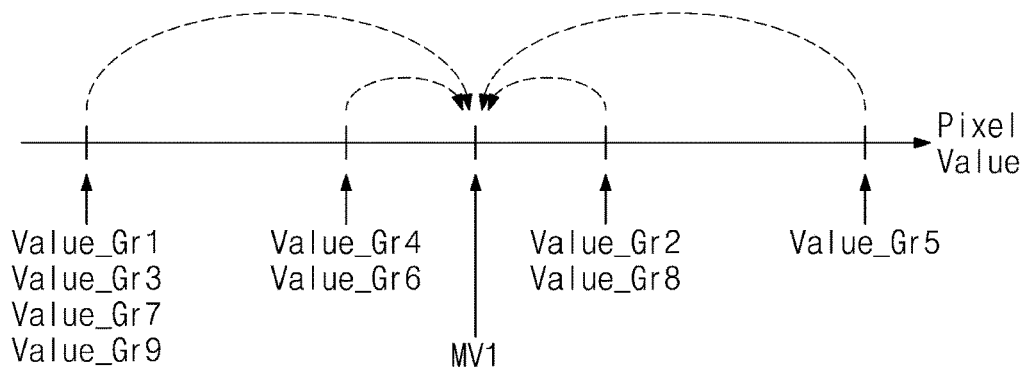
FIGS. 14A to 14C schematically illustrate various methods for determining a calibration value.
Figure 14B:
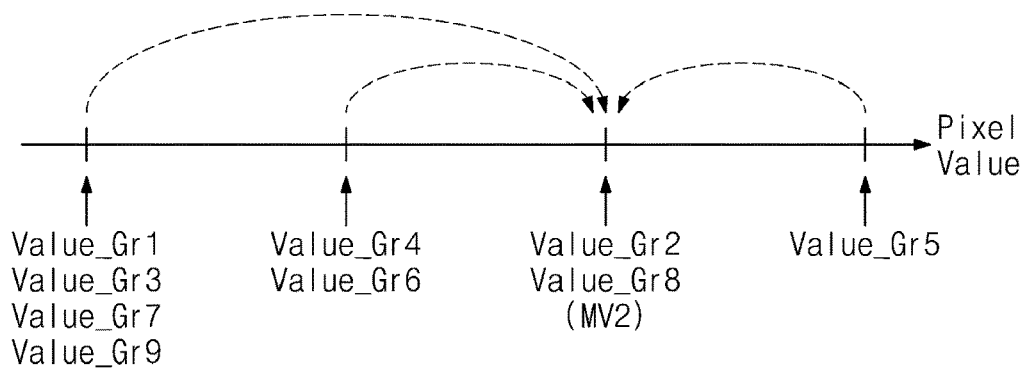
Figure 14C:
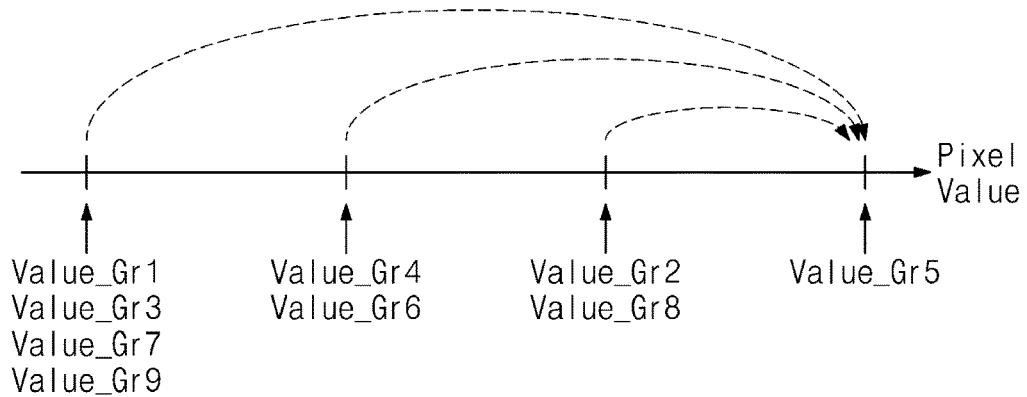

FIGS. 14A to 14C schematically illustrate various methods for determining a calibration value.

First, referring to FIG. 14A, a horizontal axis represents a pixel value (i.e., a code level). In the embodiment of FIG. 14A, the calibration value α may be determined based on an average value MV1 of all pixel values Value_Gr1 to Value_Gr9. For example, pixel values placed at the left of the average value MV1 indicate values output from pixels having a relatively high influence of crosstalk. However, the average value MV1 is exemplary. For example, the average value MV1 may be a value between the pixel value Value_Gr1 and the pixel value Value_Gr4, depending on height differences of various color filters. In this case, the calibration value α may be determined by Equation 2 below.

$$\alpha = \frac{(Value_{Gr1} + Value_{Gr2} + \ldots + Value\_Gr9)/9}{Value\_Gri} \quad \text{[Equation 2]}$$

For example, in the case of compensating a signal output from the pixel Gr1, a magnitude of the pixel value Value_Gr1 output from the pixel Gr1 may be smaller than the average value MV1. A code level of the image data IDAT_pre (refer to FIG. 7) may be multiplied by the calibration value α such that the pixel value Value_Gr1 is equal to the average value MV1 (in Equation 2 above, i being an integer between 1 and 9). In contrast, in the case of performing dark level compensation on a signal output from the pixel Gr2, a magnitude of the pixel value Value_Gr2 output from the pixel Gr2 may be greater than the average value MV1. Accordingly, the code level of the image data IDAT_pre (refer to FIG. 7) may be multiplied by the calibration value α such that the pixel value Value_Gr2 is equal to the average value MV1. Also, a code level of dark level data may be multiplied by the calibration value α. As an example, the calibration value α for an individual, particular pixel may be determined by dividing an average value MV1 of all pixels in a pixel group (e.g., average code level corresponding to an intensity or strength of a signal) by the value for the particular pixel. So, if the particular pixel has a lot of crosstalk and has a lower level than the average level, the calibration value α will be greater than 1, and if the particular pixel has less crosstalk (less than the average), the calibration value α will be less than 1. When an image is then received, for the particular pixel, whatever code level is received for the pixel will be multiplied by the previously-determined calibration value α so that the pixel code level is appropriately compensated for.

In the embodiment of FIG. 14B, the calibration value α may be determined based on an average value MV2 of the pixel values Value_Gr2 and Value_Gr8. For example, pixel values placed at the left of the average value MV2 indicate values output from pixels having a relatively high influence of the crosstalk. In this case, the calibration value α may be determined by Equation 3 below.

$$\alpha = \frac{(Value\_Gr2 + Value\_Gr8)/2}{Value\_Gri} \quad \text{[Equation 3]}$$

For example, in the case of compensating a signal output from the pixel Gr1, a magnitude of the pixel value Value_Gr1 output from the pixel Gr1 may be smaller than the average value MV2. Accordingly, the code level of the image data IDAT_pre (refer to FIG. 7) may be multiplied by the calibration value α such that the pixel value Value_Gr1 is equal to the average value MV2. Even though the pixel Gr5 is not influenced by color filters covering other pixel groups adjacent thereto, the crosstalk compensation and the dark level compensation may be performed even on a signal output from the pixel PX5. For example, a magnitude of the pixel value Value_Gr5 output from the pixel Gr5 may be greater than the average value MV2. Accordingly, the code level of the image data IDAT_pre (refer to FIG. 7) may be multiplied by the calibration value α such that the pixel value Value_Gr5 is equal to the average value MV2. Also, a code level of dark level data may be multiplied by the calibration value α.

Finally, in the embodiment of FIG. 14C, the calibration value α may be determined based on the pixel value Value_Gr5. In this case, considering that the pixel Gr5 is not influenced by color filters covering pixel groups adjacent thereto, the dark level compensation may not be performed on the pixel value Value_Gr5. In this case, the calibration value α may be determined by Equation 4 below.

$$\alpha = \frac{\text{Value\_Gr5}}{\text{Value\_Gri}} \qquad \text{[Equation 4]}$$

For example, in the case of compensating a signal output from the pixel Gr1, a magnitude of the pixel value Value_Gr1 output from the pixel Gr1 may be smaller than the pixel value Value_Gr5. Accordingly, a code level of the image data IDAT_pre (refer to FIG. 7) may be multiplied by the calibration value α such that the pixel value Value_Gr1 is equal to the pixel value Value_Gr5. Also, a code level of dark level data may be multiplied by the calibration value α. In the three examples of FIGS. 14A-14C above, the top value of the equation used to determine the calibration value α may be described as the pixel group reference value, such that the calibration value α is determined by dividing the pixel group reference value by the pixel value output from the particular pixel for which the calibration value α is being determined. It should be noted, however, that the calibration value α can also be the inverse (e.g., dividing the pixel value output from the particular pixel for which the calibration value α is being determined by the pixel group reference value), so long as all calibration values a for each of the pixels of the pixel group are determined using the same equation.

Although not described as a separate embodiment, the calibration value α may be determined based on an average value of the pixel values Value_Gr4 and Value_Gr6. In addition, the calibration value α may be determined by using various values.

Figure 15:
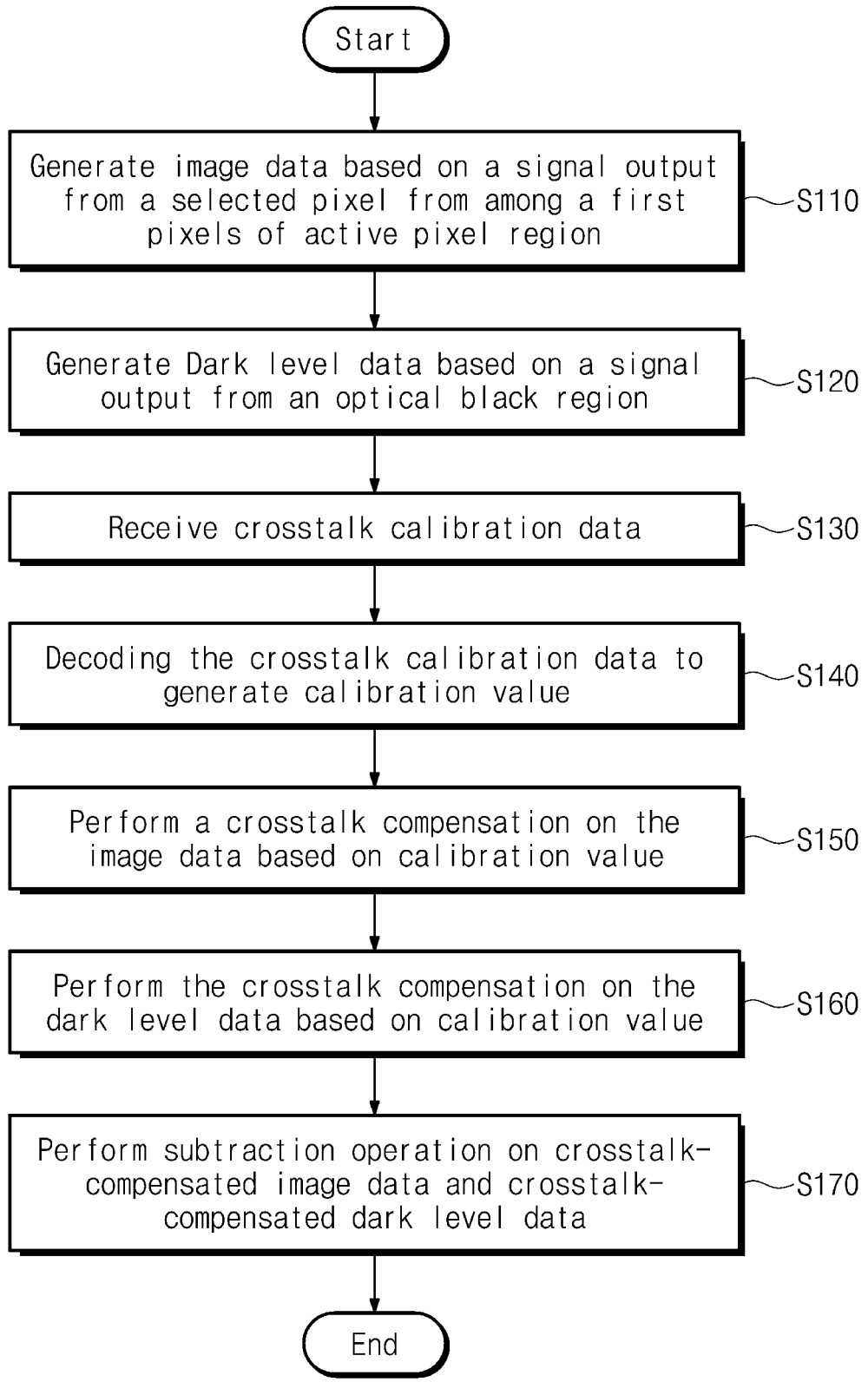
FIG. 15 illustrates a method for processing signals output from an image sensor according to an embodiment of the present disclosure.

FIG. 15 illustrates a method for processing signals output from an image sensor according to an embodiment of the present disclosure. For example, as described in the specification, an image sensor may be implemented in such a way that a plurality of pixels share a floating diffusion region. For better understanding, the description will be given with reference to FIGS. 2 and 7 together.

In operation S110, the image sensor generates image data based on a signal output from a pixel selected from pixels of an active pixel region. In detail, the ADC block 140 may convert a pixel signal output from the selected pixel to a digital signal to generate the image data. For example, the image data may include a code level including a signal level and a dark level. The signal level may correspond to a relative intensity of the received light. The dark level may be based on current produced by a pixel regardless of intensity of received light.

In operation S120, the image sensor generates dark level data based on a signal output from an optical black region. In detail, the ADC block 140 may convert a dark level offset signal output from a pixel of the optical black region to a digital signal to generate dark level data. For example, the dark level data may correspond to a dark level. Though steps S110 and S120 are shown in a particular order, they may occur in the reverse order.

In operation S130, the ISP front end block 200 receives crosstalk calibration data from the outside (e.g., from outside the image sensor 14 or outside the image processing block 10). For example, the crosstalk calibration data may be data encoded from a calibration value measured in advance. For example, the crosstalk calibration data may be stored in a memory placed inside the image processing block 10 (refer to FIG. 1) or in a memory (e.g., a host memory) placed outside the image processing block 10.

In operation S140, the calibration data decoder 240 of the ISP front end block 200 decodes the crosstalk calibration data to generate a calibration value. For example, the calibration data may include a representative value of calibration values of a specific row or column, and the calibration values of the specific row or column may be generated through an interpolation scheme or the like.

In operation S150, the crosstalk compensation may be performed on the image data. For example, the crosstalk compensation may be associated with compensating optical crosstalk due to a height difference of a first color filter covering pixels sharing a floating diffusion region and a second color filter covering other pixels sharing another floating diffusion region. For example, the crosstalk compensation may be based on a ratio of an average value, or pixel group reference value, of image data of pixels sharing a floating diffusion region and image data of a pixel selected from the pixels sharing the floating diffusion region.

In operation S160, the crosstalk compensation may be performed on the dark level data. Because the dark level included in the code level of the image data is multiplied by a calibration value in operation S150, even though the crosstalk compensation is performed on the image data, a dynamic range may decrease as much as the dark level of the code level. Accordingly, in the dark level compensation, the dark level of the dark level data may be multiplied by the calibration value.

In operation S170, a subtraction operation may be performed on the crosstalk-compensated image data and the crosstalk-compensated dark level data (e.g., subtracting the crosstalk-compensated dark level data from the crosstalk-compensated image data). As a result, the dark level may be completely removed from the code level of the image data.

Figure 16:
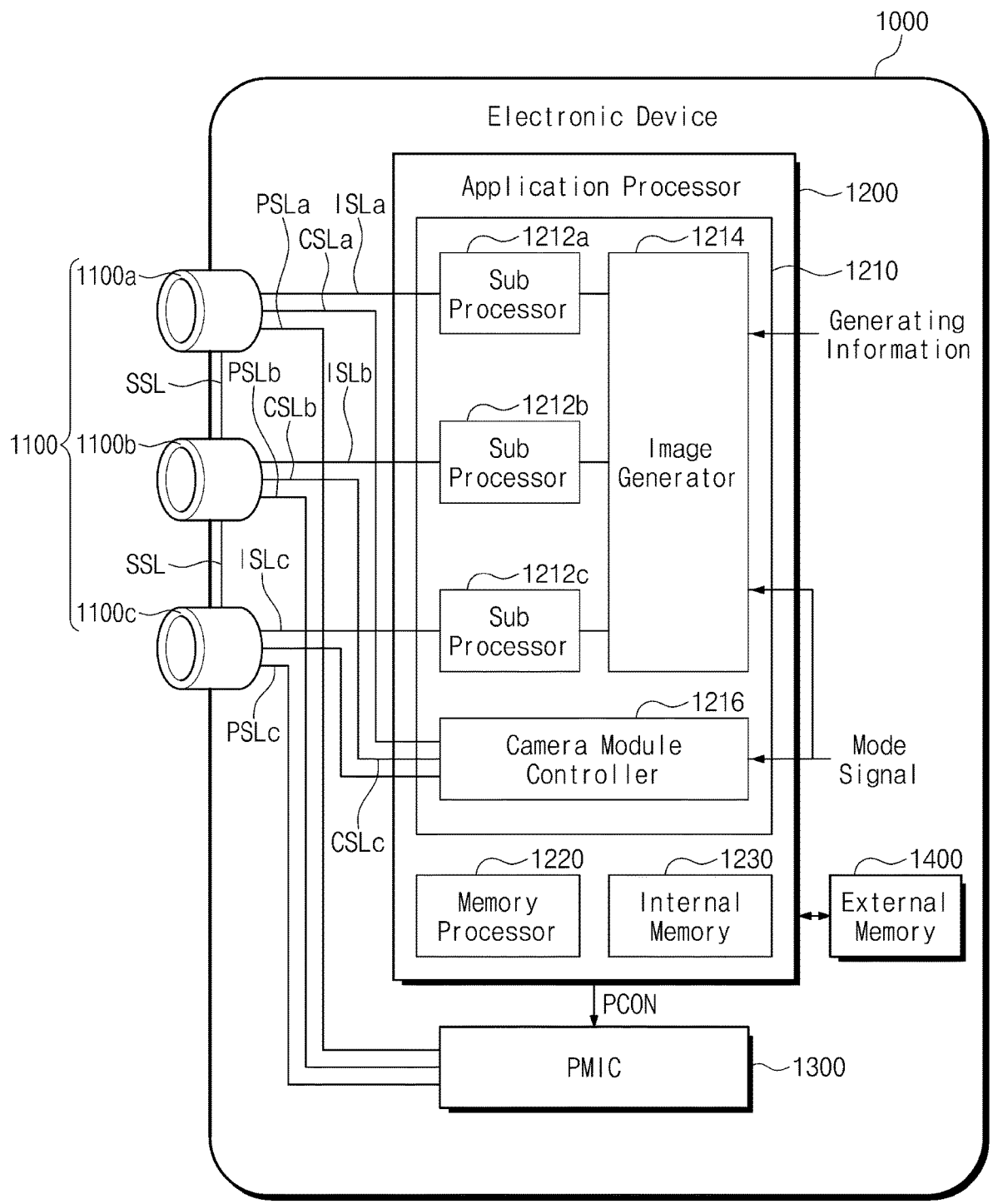
FIG. 16 illustrates an exemplary configuration of an electronic device including a multi-camera module to which crosstalk compensation of the present disclosure is applied.
Figure 17:
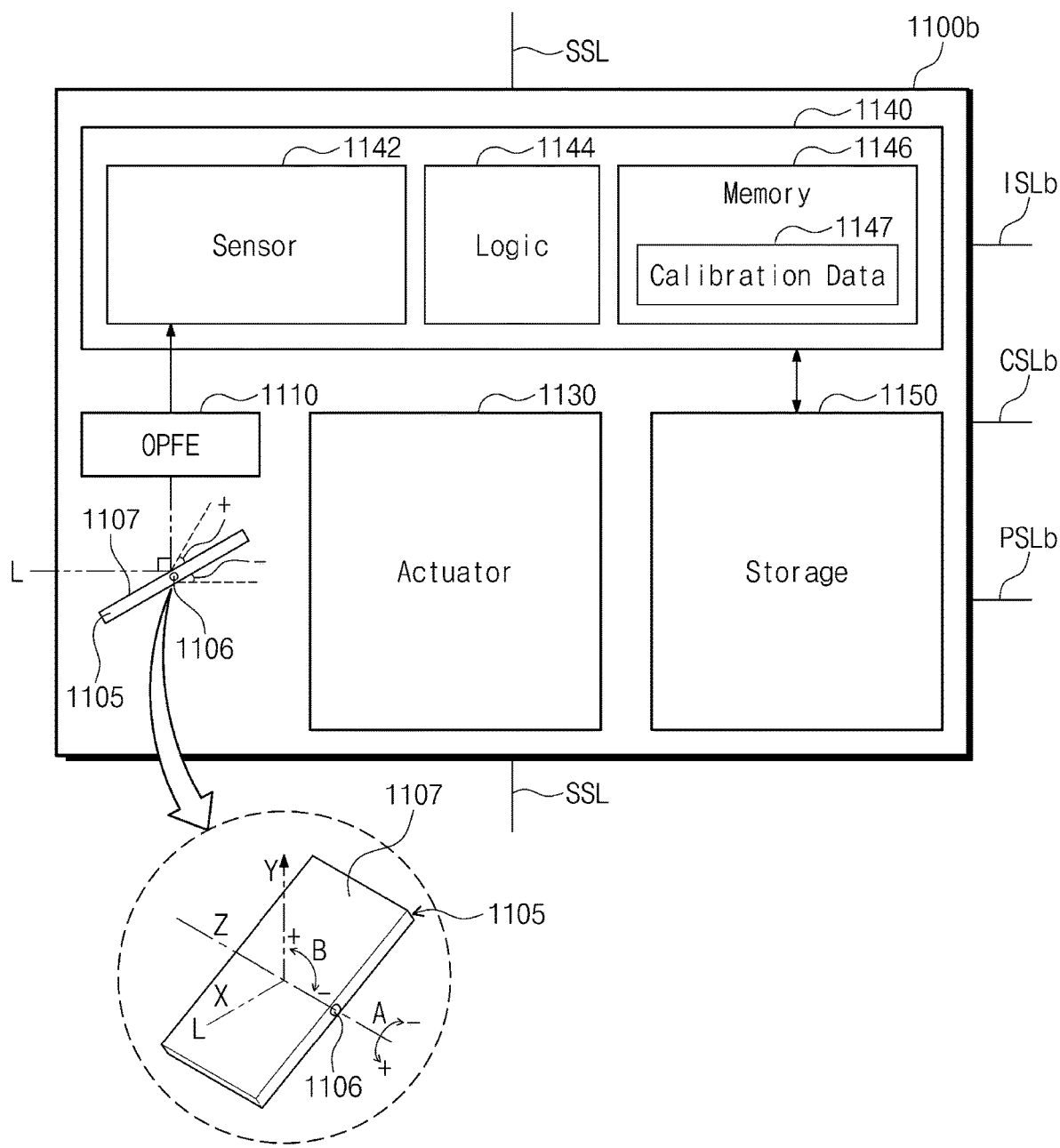
FIG. 17 illustrates an exemplary configuration of a camera module of FIG. 16.

FIG. 16 illustrates an exemplary configuration of an electronic device including a multi-camera module to which crosstalk compensation of the present disclosure is applied. FIG. 17 illustrates an exemplary configuration of a camera module of FIG. 16.

Referring to FIG. 16, an electronic device 1000 may include a camera module group 1100, an application processor 1200, a PMIC 1300, and an external memory 1400.

The camera module group 1100 may include a plurality of camera modules 1100a, 1100b, and 1100c. An electronic device including three camera modules 1100a, 1100b, and 1100c is illustrated in FIG. 16, but the present disclosure is not limited thereto. In some embodiments, the camera module group 1100 may be modified to include only two camera modules. Also, in some embodiments, the camera module group 1100 may be modified to include "n" camera modules (n being a natural number of 4 or more).

Below, a detailed configuration of the camera module 1100b will be more fully described with reference to FIG. 17, but the following description may be equally applied to the remaining camera modules 1100a and 1100c.

Referring to FIG. 17, the camera module 1100b may include a prism 1105, an optical path folding element (OPFE) 1110, an actuator 1130, an image sensing device 1140, and storage 1150.

The prism 1105 may include a reflecting plane 1107 of a light reflecting material and may change a path of a light "L" incident from the outside.

In some embodiments, the prism 1105 may change a path of the light "L" incident in a first direction "X" to a second direction "Y" perpendicular to the first direction "X". Also, the prism 1105 may change the path of the light "L" incident in the first direction "X" to the second direction "Y" perpendicular to the first direction "X" by rotating the reflecting plane 1107 of the light reflecting material in direction "A" about a central axis 1106 or rotating the central axis 1106 in direction "B". In this case, the OPFE 1110 may move in a third direction "Z" perpendicular to the first direction "X" and the second direction "Y".

In some embodiments, as illustrated, a maximum rotation angle of the prism 1105 in direction "A" may be equal to or smaller than 15 degrees in a positive A direction and may be greater than 15 degrees in a negative A direction, but the present disclosure is not limited thereto.

In some embodiments, the prism 1105 may move within approximately 20 degrees in a positive or negative B direction, between 10 degrees and 20 degrees, or between 15 degrees and 20 degrees; here, the prism 1105 may move at the same angle in the positive or negative B direction or may move at a similar angle within approximately 1 degree.

In some embodiments, the prism 1105 may move the reflecting plane 1107 of the light reflecting material in the third direction (e.g., a Z direction) parallel to a direction in which the central axis 1106 extends.

The OPFE 1110 may include optical lenses composed of "m" groups (m being a natural number), for example. Here, "m" lens may move in the second direction "Y" to change an optical zoom ratio of the camera module 1100b. For example, when a default optical zoom ratio of the camera module 1100b is "Z", the optical zoom ratio of the camera module 1100b may be changed to an optical zoom ratio of 3Z, 5Z, or 5Z or more by moving "m" optical lens included in the OPFE 1110.

The actuator 1130 may move the OPFE 1110 or an optical lens (hereinafter referred to as an "optical lens") to a specific location. For example, the actuator 1130 may adjust a location of an optical lens such that an image sensor 1142 is placed at a focal length of the optical lens for accurate sensing.

The image sensing device 1140 may include the image sensor 1142, control logic 1144, and a memory 1146. The image sensor 1142 may sense an image of a sensing target by using the light "L" provided through an optical lens. The control logic 1144 may control overall operations of the camera module 1100b. For example, the control logic 1144 may control an operation of the camera module 1100b based on a control signal provided through a control signal line CSLb. In addition, the control logic 1144 may include an ISP front end block for performing dark level compensation of the present disclosure.

The memory 1146 may store information, which is used for an operation of the camera module 1100b, such as calibration data 1147. The calibration data 1147 may include information used for the camera module 1100b to generate image data by using the light "L" provided from the outside. The calibration data 1147 may include, for example, information about the degree of rotation described above, information about a focal length, information about an optical axis, etc. In the case where the camera module 1100b is implemented in the form of a multi-state camera in which a focal length varies depending on a location of an optical lens, the calibration data 1147 may include a focal length value for each location (or state) of the optical lens and information about auto focusing. The calibration data 1147 may include crosstalk calibration data (e.g., refer to FIG. 7) for performing dark level compensation of the present disclosure.

The storage 1150 may store image data sensed through the image sensor 1142. The storage 1150 may be disposed outside the image sensing device 1140 and may be implemented in a shape where the storage 1150 and a sensor chip constituting the image sensing device 1140 are stacked. In some embodiments, the storage 1150 may be implemented with an electrically erasable programmable read only memory (EEPROM), but the present disclosure is not limited thereto.

Referring together to FIGS. 16 and 17, in some embodiments, each of the plurality of camera modules 1100a, 1100b, and 1100c may include the actuator 1130. As such, the same calibration data 1147 or different calibration data 1147 may be included in the plurality of camera modules 1100a, 1100b, and 1100c depending on operations of the actuators 1130 therein.

In some embodiments, one camera module (e.g., 1100b) among the plurality of camera modules 1100a, 1100b, and 1100c may be a folded lens shape of camera module in which the prism 1105 and the OPFE 1110 described above are included, and the remaining camera modules (e.g., 1100a and 1100c) may be a vertical shape of camera module in which the prism 1105 and the OPFE 1110 described above are not included; however, the present disclosure is not limited thereto.

In some embodiments, one camera module (e.g., 1100c) among the plurality of camera modules 1100a, 1100b, and 1100c may be, for example, a vertical shape of depth camera extracting depth information by using an infrared ray (IR). In this case, the application processor 1200 may merge image data provided from the depth camera and image data provided from any other camera module (e.g., 1100a or 1100b) and may generate a three-dimensional (3D) depth image.

In some embodiments, at least two camera modules (e.g., 1100a and 1100b) among the plurality of camera modules 1100a, 1100b, and 1100c may have different fields of view. In this case, the at least two camera modules (e.g., 1100a and 1100b) among the plurality of camera modules 1100a, 1100b, and 1100c may include different optical lens, not limited to.

Also, in some embodiments, fields of view of the plurality of camera modules 1100a, 1100b, and 1100c may be different. In this case, the plurality of camera modules 1100a, 1100b, and 1100c may include different optical lens, not limited thereto.

In some embodiments, the plurality of camera modules 1100a, 1100b, and 1100c may be disposed to be physically separated from each other. For example, the plurality of camera modules 1100a, 1100b, and 1100c may not use a sensing area of one image sensor 1142, but the plurality of camera modules 1100a, 1100b, and 1100c may include independent image sensors 1142 therein, respectively.

Returning to FIG. 16, the application processor 1200 may include an image processing device 1210, a memory controller 1220, and an internal memory 1230. The application processor 1200 may be implemented to be separated from the plurality of camera modules 1100a, 1100b, and 1100c. For example, the application processor 1200 and the plurality of camera modules 1100a, 1100b, and 1100c may be implemented with separate semiconductor chips.

The image processing device 1210 may include a plurality of sub image processors 1212a, 1212b, and 1212c, an image generator 1214, and a camera module controller 1216. The image processing device 1210 may include the plurality of sub image processors 1212a, 1212b, and 1212c, the number of which corresponds to the number of the plurality of camera modules 1100a, 1100b, and 1100c.

Image data respectively generated from the camera modules 1100a, 1100b, and 1100c may be respectively provided to the corresponding sub image processors 1212a, 1212b, and 1212c through separated image signal lines ISLa, ISLb, and ISLc. For example, the image data generated from the camera module 1100a may be provided to the sub image processor 1212a through the image signal line ISLa, the image data generated from the camera module 1100b may be provided to the sub image processor 1212b through the image signal line ISLb, and the image data generated from the camera module 1100c may be provided to the sub image processor 1212c through the image signal line ISLc. This image data transmission may be performed, for example, by using a camera serial interface (CSI) based on the MIPI (Mobile Industry Processor Interface), but the present disclosure is not limited thereto.

In some embodiments, one sub image processor may be disposed to correspond to a plurality of camera modules. For example, the sub image processor 1212a and the sub image processor 1212c may be integrally implemented, not separated from each other as illustrated in FIG. 12; in this case, one of the pieces of image data respectively provided from the camera module 1100a and the camera module 1100c may be selected through a selection element (e.g., a multiplexer), and the selected image data may be provided to the integrated sub image processor.

The image data respectively provided to the sub image processors 1212a, 1212b, and 1212c may be provided to the image generator 1214. The image generator 1214 may generate an output image by using the image data respectively provided from the sub image processors 1212a, 1212b, and 1212c, depending on generating information (or image generating information) or a mode signal.

In detail, the image generator 1214 may generate the output image by merging at least a portion of the image data respectively generated from the camera modules 1100a, 1100b, and 1100c having different fields of view, depending on the generating information or the mode signal. Also, the image generator 1214 may generate the output image by selecting one of the image data respectively generated from the camera modules 1100a, 1100b, and 1100c having different fields of view, depending on the generating information or the mode signal.

In some embodiments, the generating information may include a zoom signal or a zoom factor. Also, in some embodiments, the mode signal may be, for example, a signal based on a mode selected from a user.

In the case where the generating information is the zoom signal (or zoom factor) and the camera modules 1100a, 1100b, and 1100c have different visual fields of view, the image generator 1214 may perform different operations depending on a kind of the zoom signal. For example, in the case where the zoom signal is a first signal, the image generator 1214 may merge the image data output from the camera module 1100a and the image data output from the camera module 1100c and may generate the output image by using the merged image signal and the image data output from the camera module 1100b that is not used in the merging operation.

In the case where the zoom signal is a second signal different from the first signal, without the image data merging operation, the image generator 1214 may select one of the image data respectively output from the camera modules 1100a, 1100b, and 1100c and may output the selected image data as the output image. However, the present disclosure is not limited thereto, and a way to process image data may be modified without limitation if necessary.

In some embodiments, the image generator 1214 may generate merged image data having an increased dynamic range by receiving a plurality of image data of different exposure times from at least one of the plurality of sub image processors 1212a, 1212b, and 1212c and performing high dynamic range (HDR) processing on the plurality of image data.

The camera module controller 1216 may provide control signals to the camera modules 1100a, 1100b, and 1100c, respectively. The control signals generated from the camera module controller 1216 may be respectively provided to the corresponding camera modules 1100a, 1100b, and 1100c through control signal lines CSLa, CSLb, and CSLc separated from each other.

One of the plurality of camera modules 1100a, 1100b, and 1100c may be designated as a master camera (e.g., 1100b) depending on the generating information including a zoom signal or the mode signal, and the remaining camera modules (e.g., 1100a and 1100c) may be designated as a slave camera. The above designation information may be included in the control signals, and the control signals including the designation information may be respectively provided to the corresponding camera modules 1100a, 1100b, and 1100c through the control signal lines CSLa, CSLb, and CSLc separated from each other.

Camera modules operating as a master and a slave may be changed depending on the zoom factor or an operating mode signal. For example, in the case where the field of view of the camera module 1100a is wider than the field of view of the camera module 1100b and the zoom factor indicates a low zoom ratio, the camera module 1100b may operate as a master, and the camera module 1100a may operate as a slave. In contrast, in the case where the zoom factor indicates a high zoom ratio, the camera module 1100a may operate as a master, and the camera module 1100b may operate as a slave.

In some embodiments, the control signal provided from the camera module controller 1216 to each of the camera modules 1100a, 1100b, and 1100c may include a sync enable signal. For example, in the case where the camera module 1100b is used as a master camera and the camera modules 1100a and 1100c are used as a slave camera, the camera module controller 1216 may transmit the sync enable signal to the camera module 1100b. The camera module 1100b that is provided with sync enable signal may generate a sync signal based on the provided sync enable signal and may provide the generated sync signal to the camera modules 1100a and 1100c through a sync signal line SSL. The camera module 1100b and the camera modules 1100a and 1100c may be synchronized with the sync signal to transmit image data to the application processor 1200.

In some embodiments, the control signal provided from the camera module controller 1216 to each of the camera modules 1100a, 1100b, and 1100c may include mode information according to the mode signal. Based on the mode information, the plurality of camera modules 1100a, 1100b, and 1100c may operate in a first operating mode and a second operating mode with regard to a sensing speed.

In the first operating mode, the plurality of camera modules 1100a, 1100b, and 1100c may generate image signals at a first speed (e.g., may generate image signals of a first frame rate), may encode the image signals at a second speed (e.g., may encode the image signal of a second frame rate higher than the first frame rate), and transmit the encoded image signals to the application processor 1200. In this case, the second speed may be 30 times or less the first speed.

The application processor 1200 may store the received image signals, that is, the encoded image signals in the internal memory 1230 provided therein or the external memory 1400 placed outside the application processor 1200. Afterwards, the application processor 1200 may read and decode the encoded image signals from the internal memory 1230 or the external memory 1400 and may display image data generated based on the decoded image signals. For example, the corresponding one among sub image processors 1212a, 1212b, and 1212c of the image processing device 1210 may perform decoding and may also perform image processing on the decoded image signal.

In the second operating mode, the plurality of camera modules 1100a, 1100b, and 1100c may generate image signals at a third speed (e.g., may generate image signals of a third frame rate lower than the first frame rate) and transmit the image signals to the application processor 1200. The image signals provided to the application processor 1200 may be signals that are not encoded. The application processor 1200 may perform image processing on the received image signals or may store the image signals in the internal memory 1230 or the external memory 1400.

The PMIC 1300 may supply powers, for example, power supply voltages to the plurality of camera modules 1100a, 1100b, and 1100c, respectively. For example, under control of the application processor 1200, the PMIC 1300 may supply a first power to the camera module 1100a through a power signal line PSLa, may supply a second power to the camera module 1100b through a power signal line PSLb, and may supply a third power to the camera module 1100c through a power signal line PSLc.

In response to a power control signal PCON from the application processor 1200, the PMIC 1300 may generate a power corresponding to each of the plurality of camera modules 1100a, 1100b, and 1100c and may adjust a level of the power. The power control signal PCON may include a power adjustment signal for each operating mode of the plurality of camera modules 1100a, 1100b, and 1100c. For example, the operating mode may include a low-power mode. In this case, the power control signal PCON may include information about a camera module operating in the low-power mode and a set power level. Levels of the powers respectively provided to the plurality of camera modules 1100a, 1100b, and 1100c may be identical to each other or may be different from each other. Also, a level of a power may be dynamically changed.

According to the present disclosure, crosstalk due to a height difference of a multi-color filter array may be compensated. In particular, a fixed pattern noise (FPN) may be removed by compensating the crosstalk even in auto dark level compensation (ADLC).

While the inventive concept has been described with reference to exemplary embodiments thereof, it will be apparent to those of ordinary skill in the art that various changes and modifications may be made thereto without departing from the spirit and scope of the invention as set forth in the following claims.

What is claimed is:

1. An electronic device comprising:
a processing block configured to receive image data from an active pixel region of an image sensor and to perform pre-processing on the image data;
a crosstalk compensation block configured to perform crosstalk compensation on the pre-processed image data; and
a dark level compensation block configured to perform the crosstalk compensation on dark level data received from an optical black region of the image sensor and to perform a subtraction operation on the crosstalk-compensated image data and the crosstalk-compensated dark level data.

2. The electronic device of claim 1, further comprising:
a decoder configured to decode received crosstalk calibration data and to generate a calibration value for the crosstalk compensation.

3. The electronic device of claim 1, further comprising:
the image sensor, wherein the image sensor includes:
a pixel array including the active pixel region and the optical black region;
an analog-to-digital converter configured to convert a pixel signal output from the active pixel region to a digital signal to output a first value and to convert a dark level offset signal output from the optical black region to a digital signal to output a second value; and
a buffer configured to amplify the first value to output the image data and to amplify the second value to output the dark level data.

4. The electronic device of claim 3, wherein the pixel array includes:
a first pixel group including pixels sharing a first floating diffusion region;
a second pixel group including pixels sharing a second floating diffusion region;
a third pixel group including pixels sharing a third floating diffusion region;
a first color filter formed on the first pixel group and configured to pass a first type of light;
a second color filter formed on the second pixel group and configured to pass a second type of light; and
a third color filter formed on the third pixel group and configured to pass a third type of light.

5. The electronic device of claim 4, wherein the dark level compensation for each particular pixel of the first pixel group is performed based on a ratio of a pixel group reference value of image data of the pixels of the first pixel group to image data of the particular pixel of the first pixel group.

6. The electronic device of claim 5, wherein a first height of the first color filter formed on the first pixel group is different from a second height of the second color filter formed on the second pixel group or a third height of the third color filter formed on the third pixel group.

7. The electronic device of claim 3, wherein the pixel array includes:
a first unit pixel group including pixels sharing a first floating diffusion region;
a second unit pixel group including pixels sharing a second floating diffusion region;
a third unit pixel group including pixels sharing a third floating diffusion region;
a first color filter formed on the first unit pixel group to the third unit pixel group and configured to pass a first type of light;
a fourth unit pixel group including pixels sharing a fourth floating diffusion region;
a fifth unit pixel group including pixels sharing a fifth floating diffusion region;
a sixth unit pixel group including pixels sharing a sixth floating diffusion region; and
a second color filter formed on the fourth unit pixel group to the sixth unit pixel group and configured to pass a second type of light.

8. The electronic device of claim 7, wherein the dark level compensation for each of the pixels of the first unit pixel group to the third unit pixel group is performed based on a ratio of: an average value of image data of at least a part of the pixels of the first unit pixel group to the third unit pixel group, to image data of each of the pixels of the first unit pixel group to the third unit pixel group.

9. The electronic device of claim 8, wherein a first height of the first color filter formed on the first unit pixel group to the third unit pixel group is different from a second height of the second color filter formed on the fourth unit pixel group to the sixth unit pixel group.

10. An electronic device comprising:
an image sensor including an active pixel region and an optical black region, the active pixel region including a plurality of unit pixel groups, each of the plurality of unit pixel groups including a plurality of pixels that shares a floating diffusion region, and the image sensor outputting image data corresponding to the active pixel region and outputting dark level data corresponding to the optical black region;
an image signal processor (ISP) front end block configured to perform crosstalk compensation on the image data, to perform the crosstalk compensation on the dark level data, and to perform a subtraction operation on the crosstalk-compensated image data and the crosstalk-compensated dark level data; and
an image signal processor configured to receive and process image data on which the subtraction operation is performed.

11. The electronic device of claim 10, wherein the image sensor further includes:
a first color filter formed on a first pixel group including at least one unit pixel group from among the plurality of unit pixel groups; and
a second color filter formed on a second pixel group including at least one unit pixel group from among the plurality of unit pixel groups.

12. The electronic device of claim 11, wherein the crosstalk compensation for each individual pixel of the first pixel group is performed based on a ratio of a pixel group reference value of image data of the pixels of the first pixel group and image data of the individual pixel of the first pixel group.

13. The electronic device of claim 12, wherein a first height of the first color filter formed on the first pixel group is different from a second height of the second color filter formed on the second pixel group.

14. The electronic device of claim 10, wherein the image sensor further includes:
an analog-to-digital converter configured to convert a pixel signal output from the active pixel region to a digital signal to output a first value and to convert a dark level offset signal output from the optical black region to a digital signal to output a second value; and
a buffer configured to amplify the first value to output the image data and to amplify the second value to output the dark level data.

15. The electronic device of claim 10, wherein the ISP front end block includes:
a correlated double sampling (CDS) processing block configured to receive the image data from the active pixel region and to perform pre-processing on the image data;
a crosstalk compensation block configured to perform the crosstalk compensation on the pre-processed image data; and
a dark level compensation block configured to perform the crosstalk compensation on the dark level data and to perform a subtraction operation on the crosstalk-compensated image data and the crosstalk-compensated dark level data.

16. A method for processing signals output from an image sensor which includes an active pixel region including first pixels sharing a first floating diffusion region and second pixels sharing a second floating diffusion region and an optical black region, the method comprising:
generating image data based on a signal output from a pixel selected from the first pixels;
generating dark level data based on a signal output from the optical black region;
performing crosstalk compensation according to a height difference of a first color filter covering the first pixels and a second color filter covering the second pixels, on the image data;
performing the crosstalk compensation on the dark level data; and
performing a subtraction operation on the crosstalk-compensated image data and the crosstalk-compensated dark level data.

17. The method of claim 16, wherein the performing of the crosstalk compensation on the image data is performed based on
a ratio of an average value of image data of the first pixels to image data of the pixel selected from the first pixels.

18. The method of claim 17, wherein a first height of the first color filter formed on the first pixels is different from a second height of the second color filter formed on the second pixels.

19. The method of claim 16, further comprising:
before performing the crosstalk compensation on the image data,
receiving crosstalk calibration data from an outside of the image sensor; and
decoding the crosstalk calibration data to generate a calibration value for the crosstalk compensation.

20. The method of claim 16, further comprising:
adding a pedestal value to image data experiencing the subtraction operation.

* * * * *